(12) United States Patent
Wakasa et al.

(10) Patent No.: US 9,131,062 B2
(45) Date of Patent: Sep. 8, 2015

(54) MOBILE TERMINAL DEVICE

(75) Inventors: Tetsushi Wakasa, Kanagawa (JP); Takashi Kobiki, Kanagawa (JP); Kiyofumi Miyake, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1935 days.

(21) Appl. No.: 11/571,492

(22) PCT Filed: Jun. 29, 2005

(86) PCT No.: PCT/JP2005/012005
§ 371 (c)(1),
(2), (4) Date: Dec. 7, 2007

(87) PCT Pub. No.: WO2006/001488
PCT Pub. Date: Jan. 5, 2006

(65) Prior Publication Data
US 2011/0124362 A1    May 26, 2011

(30) Foreign Application Priority Data

Jun. 29, 2004  (JP) ................ 2004-191961
Jun. 29, 2004  (JP) ................ 2004-192219
Jun. 29, 2004  (JP) ................ 2004-192290

(51) Int. Cl.
| | | |
|---|---|---|
| H04M 1/725 | (2006.01) | |
| H04M 1/663 | (2006.01) | |
| H04M 11/10 | (2006.01) | |
| H04B 1/38 | (2006.01) | |
| H04M 11/00 | (2006.01) | |
| H04M 1/64 | (2006.01) | |
| G10L 13/00 | (2006.01) | |
| G10L 21/00 | (2013.01) | |
| G10L 25/00 | (2013.01) | |
| G06F 3/16 | (2006.01) | |
| H04M 1/57 | (2006.01) | |
| H04W 52/02 | (2009.01) | |

(52) U.S. Cl.
CPC ............ *H04M 1/72519* (2013.01); *G06F 3/16* (2013.01); *G10L 13/00* (2013.01); *H04M 1/72552* (2013.01); *H04M 1/575* (2013.01); *H04M 1/72558* (2013.01); *H04W 52/0267* (2013.01)

(58) Field of Classification Search
CPC ......... G10L 13/00; G10L 15/00; G10L 13/04; G10L 13/07; G10L 13/08; G10L 13/10; G10L 13/30; G10L 13/043; G10L 13/047; G10L 15/07; G10L 15/22; G10L 15/26; G10L 15/265; G10L 17/26; G06F 3/16; G06F 3/165; G06F 3/0482; G06F 3/04895; G06F 17/30053; G06F 17/30772; G06F 13/30899; G06F 15/16; G06F 15/173; H04L 29/06027; H04L 65/608; H04L 1/271; H04L 1/578; H04L 1/725; H04M 1/271; H04M 1/578; H04M 1/642; H04M 1/4938; H04M 1/6505; H04M 1/72552; H04M 1/72558; H04M 3/533; H04M 3/5307; H04M 3/5322; H04M 2201/39; H04M 2201/40; H04M 2203/4536; H04M 2250/74; H04M 1/7255; H04M 1/72555; G06Q 30/06; H04Q 2213/13377
USPC ........ 455/412.2, 414.3, 414.4, 415, 418, 419, 455/421, 557, 566, 567; 340/425.5, 573.1; 379/88.04, 88.12, 88.14; 704/260, 275; 709/203, 204
See application file for complete search history.

(56) References Cited

U.S. PATENT DOCUMENTS

| | | | | |
|---|---|---|---|---|
| 5,555,343 | A  * | 9/1996 | Luther ........................ | 704/260 |
| 5,634,084 | A  * | 5/1997 | Malsheen et al. ............ | 704/260 |
| 5,703,947 | A  * | 12/1997 | Hino et al. .................... | 379/419 |
| 5,924,068 | A  * | 7/1999 | Richard et al. ............... | 704/260 |
| 6,115,686 | A  * | 9/2000 | Chung et al. ................. | 704/260 |
| 6,151,493 | A | 11/2000 | Sasakura et al. | |
| 6,522,878 | B1 * | 2/2003 | Andrews et al. ............. | 455/425 |
| 6,708,152 | B2 * | 3/2004 | Kivimaki ...................... | 704/260 |
| 6,728,934 | B1 * | 4/2004 | Scopes .......................... | 715/205 |
| 6,760,704 | B1 * | 7/2004 | Bennett ......................... | 704/270 |

| | | | |
|---|---|---|---|
| 7,123,936 B1* | 10/2006 | Rydbeck et al. | 455/557 |
| 7,424,631 B2 | 9/2008 | Ishidera et al. | |
| 7,519,386 B2* | 4/2009 | Kespohl et al. | 455/550.1 |
| 2001/0014860 A1* | 8/2001 | Kivimaki | 704/260 |
| 2003/0032415 A1* | 2/2003 | Cho et al. | 455/415 |
| 2003/0068020 A1* | 4/2003 | Hamrick et al. | 379/88.21 |
| 2003/0114189 A1* | 6/2003 | Moon | 455/556 |
| 2003/0217279 A1* | 11/2003 | Fuchigami et al. | 713/189 |
| 2004/0204125 A1* | 10/2004 | Messel et al. | 455/566 |
| 2005/0174889 A1* | 8/2005 | Marcantonio et al. | 368/12 |
| 2006/0009868 A1* | 1/2006 | Park | 700/94 |

FOREIGN PATENT DOCUMENTS

| | | |
|---|---|---|
| JP | 04200140 A | 7/1992 |
| JP | 06224845 A | 8/1994 |
| JP | 07-152532 A | 6/1995 |
| JP | 08079339 A | 3/1996 |
| JP | 10032858 A | 2/1998 |
| JP | 10078490 A * | 3/1998 |
| JP | 10200957 A | 7/1998 |
| JP | 11088499 A | 3/1999 |
| JP | 11237167 A | 8/1999 |
| JP | 11-252216 | 9/1999 |
| JP | 2000250654 A | 9/2000 |
| JP | 2001257748 A | 9/2001 |
| JP | 2001339490 A | 12/2001 |
| JP | 2001350692 A | 12/2001 |
| JP | 2002051135 A | 2/2002 |
| JP | 2002055925 A | 2/2002 |
| JP | 2002185569 A | 6/2002 |
| JP | 2002261885 A | 9/2002 |
| JP | 2002271512 A | 9/2002 |
| JP | 2002281130 A | 9/2002 |
| JP | 2003-030113 A | 1/2003 |
| JP | 2003114687 A | 4/2003 |
| JP | 2003208189 A | 7/2003 |
| JP | 2004029490 A | 1/2004 |
| JP | 2004072744 A | 3/2004 |
| WO | 02065263 A1 | 8/2002 |

OTHER PUBLICATIONS

Japanese language office action dated Mar. 30, 2010 and its English language translation for corresponding Japanese application 2004192290.

Japanese language office action dated Mar. 30, 2010 and its English language translation for corresponding Japanese application 2004191961.

Japanese language office action dated Nov. 10, 2009 and its English language translation for corresponding Japanese application 2004191961.

Japanese language office action dated Apr. 6, 2010 and its English language translation for corresponding Japanese application 2004192219.

Japanese language article from NTT Technical Journal, vol. 6, pp. 63-68, 1997.

Japanese language office action dated Jul. 12, 2011 and its English language translation for corresponding Japanese application 2009236261.

Japanese language interrogatory dated Jun. 5, 2012 and its English language translation issued in corresponding Japanese application 2009236261.

Japanese language office action dated Nov. 20, 2012 and its English language translation issued in corresponding Japanese application 2009236261.

* cited by examiner

*Primary Examiner* — Yuwen Pan
*Assistant Examiner* — Paul P Tran
(74) *Attorney, Agent, or Firm* — Studebaker & Brackett PC

(57) ABSTRACT

A mobile terminal device able to automatically set suitable field break positions in accordance with the situation, able to realize a skip operation and back skip operation by specific operations, able to efficiently utilize a readout function, and able to improve convenience to a user is provided. It has an operation unit 19 for instructing a readout function, a memory 12 storing text, a text-to-speech unit 20 for converting text data stored in the memory 12 to speech data at the time of readout, an audio output unit 21 for outputting the speech data, and a control unit 26 for recognizing predetermined breaks from the text to be read out when outputting the speech data at the audio output unit 21 and performing control so as to output the words from either a break position before or after the readout target text at the point of time of the input of instruction as the speech data by the audio output unit when there is a predetermined instruction by the operation unit 19.

30 Claims, 22 Drawing Sheets

FIG. 2C  FIG. 2A
FIG. 2D  FIG. 2B
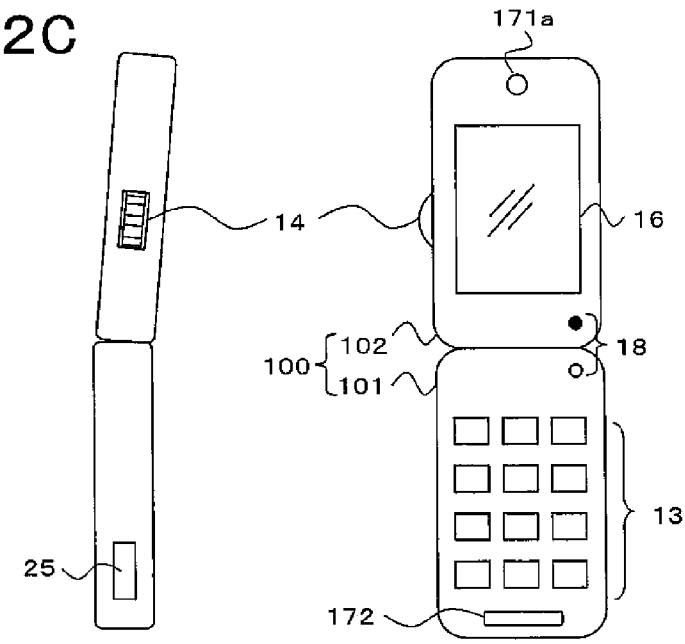
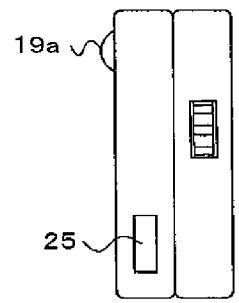
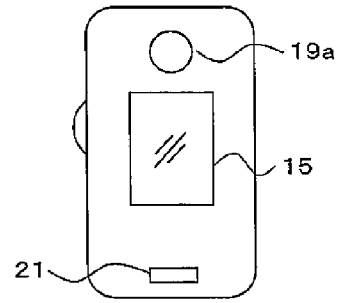

FIG. 3

|   | SIGNAL | OPERATION CONTENT |
|---|---|---|
| (a) | ON / OFF ⎯⎯⎤__ | SKIP |
| (b) | ON / OFF __⎡⎤__ | BACK SKIP |
| (c) | ON / OFF __⎦⎯⎯ | OPERATION NOT CONNECTED TO PRESENT FUNCTION ※CALL RESPONSE (/HOLD CANCELLATION) |

FIG. 5

[RECEPTION DATA]

— HEADER UNIT—
DATE: 2004/3/20
FROM: KYOSERA TARO
SUBJECT: IT'S FINE ISN'T IT …

— TEXT —
IT'S FINE TODAY, ISN'T IT ?
WILL TOMORROW BE FINE
TOO ? LET'S GO OUT NEXT
TIME !

※EXAMPLE OF CASE OF RECEPTION FROM MAILER

FIG. 6

[TABLE]

| ITEM NUMBER | VALUE (TEXT DATA) | |
|---|---|---|
| 1 | RECEIVED: MARCH 20, 2004 | DATE |
| 2 | SENDER: KYOCERA TAROSAN | FROM |
| 3 | SUBJECT: IT'S FINE ISN'T IT ? | SUBJECT |
| 4 | TEXT: IT'S FINE TODAY, ISN'T IT ? | DIVIDED BY PUNCTUATION MARK ETC. |
| 5 | WILL TOMORROW BE FINE TOO ? | |
| 6 | LET'S GO OUT NEXT TIME ! | |
| 7 | MAIL END | SENTENCE END |

※ EXAMPLE OF CASE OF RECEPTION FROM MAILER
※ UNDERLINE IS STANDARD FORMAT ADDITIONAL TEXT FOR EACH ITEM

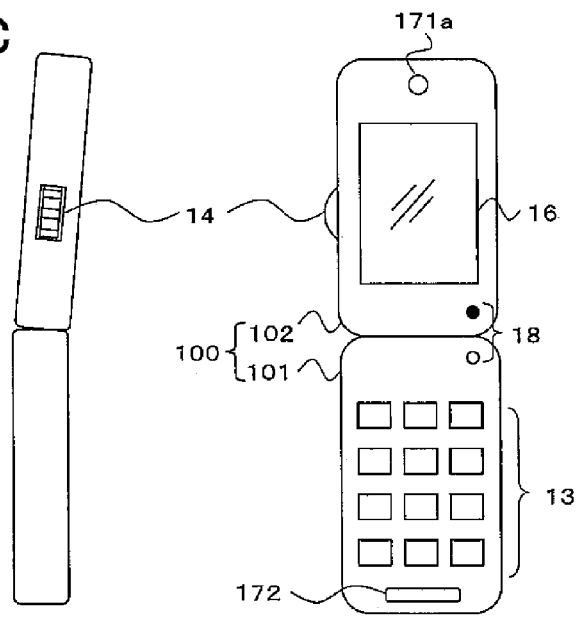
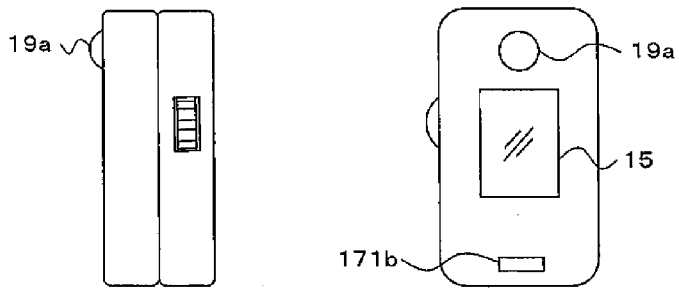

FIG. 13

CONTROL TABLE OF AUDIO READOUT FUNCTION (EXAMPLE)

| CATEGORY | DETAILS | READOUT: ON/OFF |
|---|---|---|
| BATTERY SITUATION | BATTERY FLAG: 0 | ON |
| | BATTERY FLAG: 1 | ON |
| | BATTERY FLAG: 2 | OFF |
| | BATTERY FLAG: 3 | OFF |
| ELECTRIC WAVE SITUATION | OUTSIDE AREA (TIME WHEN COMMUNICATION IS IMPOSSIBLE) | ON |
| | ELECTRIC WAVE: 0 | ON |
| | ELECTRIC WAVE: 1 | ON |
| | ELECTRIC WAVE: 2 | OFF |
| | ELECTRIC WAVE: 3 | OFF |
| OTHERS | TIME OF COMPLETION OF CHARGING | ON |
| | WHILE TALKING | ON |
| | TIME OF RECOVERY OF ELECTRIC WAVE SITUATION | ON |
| | TIME OF CALLING, MAIL RECEPTION *RECEPTION SOUND IS AUDIO ALARM | ON |
| | UNREAD MAIL · ABSENT RECORD EXIST | OFF |

※ AUDIO READOUT NOT CARRIED OUT DURING SILENT MODE, DRIVE MODE, AND KEY LOCK

FIG. 14

| WEIGHTING TABLE CONCERNING AUDIO READOUT FUNCTION | | |
|---|---|---|
| CATEGORY | DETAILS | READOUT: ON/OFF |
| BATTERY SITUATION | BATTERY FLAG: 0 | 4 |
| | BATTERY FLAG: 1 | 3 |
| | BATTERY FLAG: 2 | 2 |
| | BATTERY FLAG: 3 | 1 |
| ELECTRIC WAVE SITUATION | OUTSIDE AREA (TIME WHEN COMMUNICATION IS IMPOSSIBLE) | 5 |
| | ELECTRIC WAVE: 0 | 4 |
| | ELECTRIC WAVE: 1 | 3 |
| | ELECTRIC WAVE: 2 | 2 |
| | ELECTRIC WAVE: 3 | 1 |

FIG. 22A

| EVENT TYPE | LIGHT EMISSION COLOR |
|---|---|
| UNANSWERED CALL EXISTS | RED |
| MESSAGE EXISTS | BLUE |
| UNREAD E MAIL EXISTS | GREEN |
| UNREAD C MAIL EXISTS | YELLOW |
| ALARM | WHITE |

FIG. 22B

| READOUT RANGE | LIGHT EMISSION PATTERN |
|---|---|
| ONLY NUMBER | ⎍ |
| NUMBER + MAME | ⎍⎍ |
| NUMBER + NAME + TITLE | ⎍⎍⎍ |
| NUMBER + NAME + TITLE + TEXT | ⎍⎍⎍⎍ |

FIG. 23A

| OTHER PARTY OF CALL | LIGHT EMISSION COLOR |
|---|---|
| MR. A | RED |
| MR. B | BLUE |
| MR. C | GREEN |
| GROUP D | YELLOW |
| GROUP E | WHITE |

FIG. 23B

| READOUT RANGE | LIGHT EMISSION PATTERN |
|---|---|
| ONLY NUMBER | ⎍ |
| NUMBER + MAME | ⎍⎍ |
| NUMBER + NAME + TITLE | ⎍⎍⎍ |
| NUMBER + NAME + TITLE + TEXT | ⎍⎍⎍⎍ |

MOBILE TERMINAL DEVICE

TECHNICAL FIELD

The present invention relates to a for example mobile phone or other mobile terminal device for wireless communications, more particularly relates to a mobile terminal device having a function of reading out fields in a display by audio.

BACKGROUND ART

In recent years, as a mobile terminal device, a mobile phone reading out function names etc. set by a key operation corresponding to such a key operation has been proposed (see for example Patent Document 1).

This mobile phone has a plurality of key operation units, a control unit for setting functions corresponding to the key operations among a plurality of functions provided in the phone according to one or more key operations of the key operation units, and a text-to-speech unit for outputting by audio the function names set linked with the key operations.

This mobile phone only converts a retrieval result of a speed dialing memory to audio information for transmission to the user in response to a key operation. The information provided by the audio is basically sequentially output and not listed up. Therefore, it is difficult for the user to pick up and delete fields and acquire the audio information according to the degree of importance. There is therefore the disadvantage that the so-called readout function cannot be efficiently utilized.

As a terminal device having the audio output function described above, an information output device preventing an operator (user) from erroneous recognition of information when converting news, advertisements, and other text having a set amount of meaning to audio for reproduction and output is known. Further, a text readout device designed to shorten the time for checking required mail from among mail read out by the mail readout device is known.

The former information output device is a device reading out the information stored in an information storage from a predetermined read position to audio for reproduction and output. When a read start position of the information is determined by an instruction by a play-backward button, a read out control unit moves to a first break position before the determined read position of the information, while when the read start position of the information is determined by instruction by a fast forward button, it moves the determined read start position of the information to the first break position after it, so as to thereby finally determine the read start position of the information.

When the latter text readout device accesses a data processing system from the phone to read out mail, first the headers of the mails are sequentially output by the text-to-speech unit. The user registers senders or subjects or both as skip conditions in a skip condition holder for unnecessary mail. Thereafter, when reading the headers, a skip condition judger judges the conditions so that the mail meeting the skip conditions are not read. Further, when required mail is found, its text is output by the text-to-speech unit in response to an instruction.

Patent Document 1: Japanese Patent Publication (A) No. 11-252216

DISCLOSURE OF THE INVENTION

Problem to be Solved by the Invention

The information output device explained above basically handles text information comprised of a string of sentences, but does not handle menu displays etc. accompanying the operation of a terminal. Further, the break positions are automatically set considering first avoiding reproduction from an unnatural position after the play-backward and play-forward operations and cannot be said to be sufficient from the viewpoint of supporting pickup and deletion according to the degree of importance. For example, the header information of the mail is not recognized as header information, therefore, the reception date, sender, and subject are handled in the same way as the low degree of importance information "Return path", "to", etc. not requiring readout.

The above-explained text readout device mainly focuses on the operation property when selecting and reproducing required mail, therefore can use only the "subject" and "sender" as skip conditions. Further, the operation property when reading out the mail is not improved.

Further, in the devices explained above, there is the disadvantage that functions for improving the convenience of the user are not provided for externally connected devices such as earphones/microphones.

Further, as devices having audio output functions, a device issuing an audio alarm to a fixed phone or mobile phone when a suspicious person invades the house and able to transmit the sound on the scene when a button switch set to the readout function is depressed, a device gradually raising the audio alarm to thereby obtaining a psychological effect, and so on have been proposed. Such a mobile phone, however, only converts the retrieval result of the speed dialing memory to audio information for transmission to the user in response to a key operation and does not consider the generation of an audio alarm before audio readout.

The former device other than Patent Document 1 explained above can be set for readout by depression of a button switch or automatic readout, but does not have the function of generating an audio alarm etc. when set to automatic. For this reason, there is a possibility that the first words when the readout starts will not be able to be heard. Further, the user cannot set the audio alarm before readout, therefore judgment of whether the audio alarm is for himself becomes slow. Further, there is the disadvantage that the audio alarm is issued even when not necessary.

In a mobile phone, the technique of turning on an LED when receiving an e-mail so as to notifying the user of reception of the e-mail is known.

However, the light emission pattern of an LED in a conventional mobile phone is simple, therefore the information which can be given to the user is limited. The variety of functions of the mobile phone cannot be handled. Further, in a case of a folder type (flip-open type) mobile phone, in order for the user to actually check the content of an e-mail after notification of it, he must open the case and further perform predetermined key operations, therefore the operation is troublesome. In particular, when using audio readout as guidance, access to the text of the received mail inevitably becomes slow.

An object of the present invention is to provide a mobile terminal device able to automatically set a suitable field break position in accordance with the situation, able to realize a skip operation and a back skip operation by specific operations, able to efficiently utilize the readout function, and able to improve the convenience to the user.

Another object of the present invention is to provide a mobile terminal device enabling a user to set an audio alarm before readout without requiring a troublesome operation and in addition able to generate an audio alarm only when it is necessary.

Still another object of the present invention is to provide a mobile terminal device able to notify a user of a variety of information and enabling check of the content of the information by a simple operation.

Means for Solving the Problem

According to the present invention, there is provided a mobile terminal device having an audio readout function, said mobile terminal device comprising a storage unit for storing text in accordance with a readout item, an audio alarm generation unit for generating an audio alarm, a text-to-speech unit for converting the text stored in said storage to speech data at the time of readout, an audio output unit for outputting said speech data or said audio alarm, and a control unit for processing a first control routine of outputting said audio alarm at said audio output unit and then outputting the speech data when outputting said speech data at said audio output unit and a second control routine of outputting the speech data without outputting said audio alarm at said audio output unit.

Preferably, the device has an operation unit able to instruct the readout, and said control unit starts the readout in said second control routine when readout is instructed by said operation unit.

Preferably, when a change of state occurs, said control unit starts the readout in accordance with said change of state by said first control routine.

Preferably, the device is provided with a battery, and said change of state is a change of a remaining level of said battery life.

Preferably, the device is provided with a communication unit, and said change of state is a change an electric wave state in said communication unit.

Preferably, as said change of state, weighting is assigned for each state, and said control unit starts the readout in accordance with said weighting.

Further preferably the device is provided with a communication unit which can be connected to a communication network and an audio notification generation unit for generating an audio notification, wherein when processing occurs for reception of a message or call from said communication network by said communication unit, said control unit makes said audio output unit output said audio notification and performs the readout in said second control routine.

Preferably, said control unit makes said audio output unit output said speech data after an elapse of a predetermined time from the output of said audio alarm at the time of readout in said first control routine.

Preferably, the device is provided with an operation unit, and said control unit stop said audio output unit to output said speech data when there is an input from said operation unit during said predetermined time.

Preferably, said operation unit is linked with predetermined processing, and said control unit only stops said audio output unit outputting said speech data and does not perform said predetermined processing when input occurs from said operation unit during said predetermined time.

Preferably, the device is provided with an operation unit, said text has break positions, and said control unit can recognize the predetermined break in the text data to be read out when said audio output unit outputs said speech data, and if a predetermined instruction is made by said operation unit, said control unit performs control so as to read out the text from either of the break positions before or after the readout position of the text when a instruction input is occurred.

Preferably, the predetermined instruction instructed by said operation unit is a play-forward or play-backward operation, and said control unit performs control so as to read out the text from the nearest break position in an unoutput direction of the text at the time of the instruction input during readout when said predetermined instruction is an instruction for play-forward and performs control so as to read out the text from the nearest break position in an outputted direction at the time of the instruction input when the predetermined instruction is an instruction for playing-backward.

Preferably, said break position is a position given a punctuation mark.

Preferably, the device is provided with a communication unit connected to a communication network and transmitting or receiving a message, and said control unit performs control so as to consider a position between a component indicating a sender or a destination of the message and a component indicating the body of message as said break position at the time of readout of said message.

Preferably, said control unit performs control to read out a component name together with each component at the time of readout of said message.

Preferably, said storage stores text of honorifics and address information including names, and said control unit performs control so as to read out said honorific together with the name retrieved from said address information based on the component indicating the sender or destination of the message at the time of readout of said message.

Preferably, the device is provided with an external connection device having an external operation unit connecting externally to instruct a readout operation to said control unit and a second audio output unit, wherein said control unit performs control so as to output said speech data at said second audio output unit when said external connection device is connected.

Preferably, the device is provided with a communication unit which can be connected to a communication network and an audio notification generation unit for generating an audio notification, and wherein said control units performs control so as to generate said audio notification and make said second audio output unit output the audio notification when said communication unit receives a call reception request from said communication network, suspend the output of the audio notification and make said communication unit start response processing to said call reception request when said external operation unit is operated.

Preferably, said external operation unit includes at least one key, and said control unit has a plurality of processing as said predetermined instruction, counts a number of times of input of a signal generated by operation of said key in a predetermined time, and processes any of said plurality of processing in accordance with the count.

Preferably, said external operation unit is configured by at least one key, and said control unit has a plurality of processing as said predetermined instruction, counts a time which the signal generated by operation of said key continues, and processes any of said plurality of processing in accordance with the continuing time.

Preferably, said predetermined instruction is a play-forward or play-backward operation, and when a play-forward instruction occurs from said operation unit while reading out text at a first speed that is normal speed at said audio output unit, said control unit performs control so as to reads out the text at a second speed faster than the first speed from a position reading at a time of said play-forward instruction occurs to a break position nearest forward to the position of said play-forward instruction occurs at a second speed faster than the first speed, and then performs control so as to return the speed to the first speed since said break position for readout.

Preferably, said predetermined instruction includes a play-backward operation, and when a play-backward instruction occurs from said operation unit, said control unit performs control so as to return to the position of break backward to the readout position at the point of time of the play-backward instruction for readout, and if another play-backward instruction occurs after said play-backward instruction, said control unit performs control so as to return to a further prior break position for readout.

Preferably, the device has a light emission unit and an operation unit able to instruct readout, wherein said control unit performs control so as to instruct light emission to said light emission unit when a change of state occurs, and to read out information concerning the change of state when said operation unit is operated after the light emission unit is made to emit light.

Preferably, said operation unit includes a plurality of input keys, a plurality of said light emission units are provided and linked with the plurality of input keys of said operation unit, and said control unit performs control so as to instruct light emission to one of said light emission units in accordance with the type of the change of state when a change of state occurs, and to instruct readout of information concerning the change of state when said input key corresponding to the light emission unit instructed to perform the light emission is operated.

Preferably, the device is provided with a plurality of connected cases able to form an opened state/closed state, wherein said input keys and said light emission units are arranged at exposed positions in the closed state of said cases.

Preferably, when said case is formed to a opened state while light emitted by said light emission unit with the case closed, said control unit performs control so as to read out information concerning the change of state causing the light emission.

Preferably, said light emission unit has a plurality of light emission type, and said control unit instructs light emission with one light emission type previously assigned to the type of change of state among said plurality of light emission types.

Preferably, said text comprises a plurality of items, and said control unit can perform control so as to read out said text for each item, and makes the light emission unit emit light with one light emission type previously assigned to each of said plurality of items from among said plurality of light emission types.

Preferably, said text comprises a plurality of items, and said control unit can perform control so as to read out said text for each item, and makes the light emission unit emit light with one light emission type previously assigned to each of a combination of items of said text.

Further, according to the present invention, there is provided a readout control method in a mobile terminal device having an audio readout function, said readout control method comprising a step of storing text in accordance with a readout item, a step of generating an audio alarm, an text-to-speech step of converting said text to speech data at the time of readout, an audio output step of outputting said speech data or said audio alarm, a first control step of outputting the speech data after outputting said audio alarm when outputting said speech data in said audio output step, and a second control step of outputting said speech data without outputting said audio alarm.

Further, according to the present invention, there is provided A computer program for making a computer of a mobile terminal device has a storage unit for storing text in accordance with a readout item, an audio alarm generation unit for generating an audio alarm, a text-to-speech unit for converting the text stored in said storage unit to speech data at the time of readout, and an audio output unit for outputting said speech data or said audio alarm execute text-to-speech processing of outputting said speech data in said audio output step, a first control processing of outputting the speech data after outputting said audio alarm, and a second control processing of outputting said speech data without outputting said audio alarm.

Effect of the Invention

According to the present invention, a suitable field break position in accordance with the situation can be automatically set, a skip operation and back skip operation can be accomplished by specific operations, and the read function can be efficiently utilized.

Further, the convenience of the user can be improved.

According to the present invention, there are the advantages that the audio alarm before readout can be set by the user without troublesome operation and in addition an audio alarm can be generated only at the time when it is necessary.

According to the mobile terminal device of the present invention, a variety of information can be notified to the user, and contents of the information can be checked by a simple operation, therefore the operation friendliness is improved.

BRIEF DESCRIPTION OF THE DRAWINGS

FIG. 2A to FIG. 2D are diagrams illustrating an example of the outer appearance of the mobile phone of the first embodiment, in which FIG. 2A shows a view of the outer appearance of a front surface, FIG. 2B shows a view of the outer appearance of a back surface, FIG. 2C shows a view of the outer appearance of the front surface, and FIG. 2D shows a view of the outer appearance of the back surface.

FIG. 3 is a diagram showing an example of signals when identifying three types of operations in the first embodiment.

FIG. 5 is a diagram showing an example of data received at the time of a readout operation according to the first embodiment and shows an example of a case of receiving data by a mailer.

FIG. 6 is a diagram showing an example of a table prepared by a text extraction unit based on the data received at the time of a readout operation according to the first embodiment.

FIGS. 12A to FIG. 12D are diagrams illustrating an example of the outer appearance of a mobile phone of the second embodiment, in which FIG. 12A shows a view of the outer appearance of the front surface, FIG. 12B shows a view of the outer appearance of the back surface, FIG. 12C shows a view of the outer appearance of the front surface, and FIG. 12D shows a view of the outer appearance of the back surface.

FIG. 13 is a diagram showing an example of a control table according to the second embodiment.

FIG. 14 is a diagram showing an example of a weighting table according to the second embodiment.

FIG. 20A to FIG. 20D are diagrams illustrating an example of the outer appearances of the mobile phone of the third embodiment, in which FIG. 20A shows a view of the outer appearance of the front surface, FIG. 20B shows a view of the outer appearance of the back surface, FIG. 20C shows a view of the outer appearance of the front surface, and FIG. 20D shows a view of the outer appearance of the back surface.

FIG. 22A and FIG. 22B show examples of light emission patterns according to types of events of the third embodiment.

FIG. 23 show examples of the light emission patterns in accordance with the other call party of the third embodiment.

DESCRIPTION OF NOTATIONS

Figure 1:
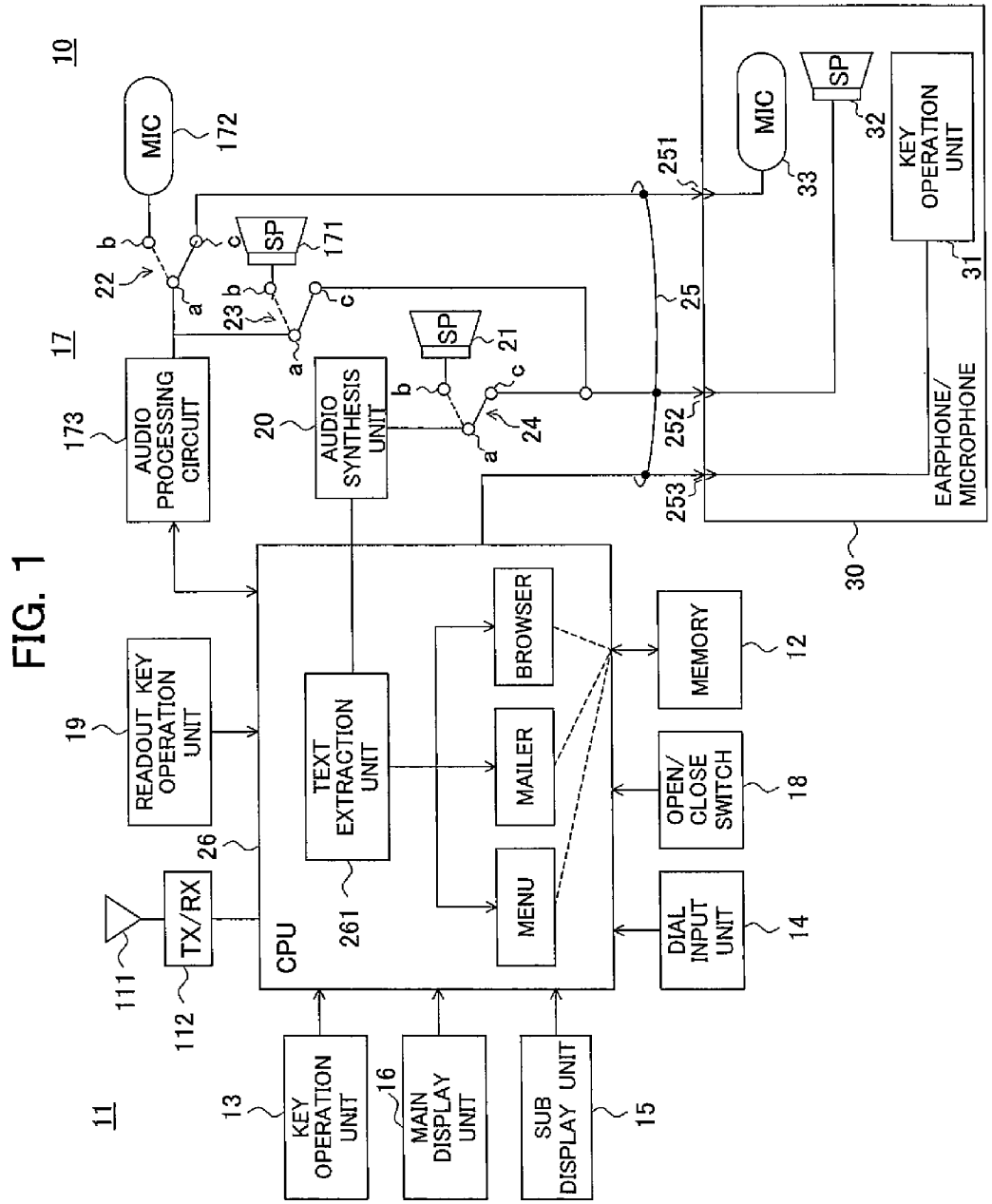
FIG. 1 is a block diagram illustrating an example of a system configuration of a mobile phone of a first embodiment.

10 . . . mobile phone
100 . . . body case
101 . . . key input side body case
102 . . . display side body case
11 . . . communication processing unit
111 . . . transmission/reception antenna
12 . . . memory
13 . . . key operation unit
14 . . . dial input unit
15 . . . sub display unit
16 . . . main display unit
17 . . . audio processing unit
171 . . . speaker
172 . . . microphone
18 . . . open/close switch
19 . . . readout key operation unit
20 . . . text-to-speech unit
21 . . . ringer speaker
22 to 24 . . . switch circuits
25 . . . external device connection terminal
26 . . . control unit
30 . . . earphone/microphone
31 . . . key operation unit
32 . . . speaker
33 . . . microphone
40 . . . light emission unit
50 . . . audio alarm generation unit

BEST MODE FOR WORKING THE INVENTION

Below, embodiments of the present invention will be explained with reference to the attached drawings.

First Embodiment

FIG. 1 is a block diagram illustrating an example of the system configuration of a mobile phone 10 according to an embodiment of the mobile terminal device of the present invention. FIG. 2A to FIG. 2D are diagrams illustrating an example of the outer appearance of the mobile phone 10.

The mobile phone 10 is a so-called flip-open type mobile phone having a moveable mechanism. FIG. 2A shows a front view in a state when opened (opened state), FIG. 2B shows a front view in a state when closed (closed state), FIG. 2C shows a side view in the opened state, and FIG. 2D shows a side view in the closed state.

The mobile terminal device 10 according to the present embodiment has an audio readout function in addition to usual functions of a mobile phone and can be connected to an external connection device comprised of an earphone/microphone provided with an external operation unit able to be externally connected and instruct the readout operation for remote control. It and is provided with a function of switching the output of the audio output unit to the earphone/microphone when connected to an external connection device.

The mobile phone 10 (including a case where the earphone/microphone is connected and a case where it is not connected) is configured so as to define an effective rule of automatic setting of a break position along with the degree of importance of the information for the user in a scene where data format such as a menu display, mailer, and browser and a series of operations are defined and enable efficient pickup and deletion of information by the user by making good use of the skip operation during the audio readout.

For example, the mobile phone 10 according to the present embodiment, at the time of readout of the mail text, sets the break positions by information peculiar to e-mail such as the "reception date", "sender", "subject", and "text" and, at the same time, inserts these field headings at the headers of breaks as standard format texts, and becomes able to perform the skip operation while checking field names in this sequence.

Further, in the mobile phone 10 according to the present embodiment, by setting positions given marks defined by the JIS such as punctuation marks, exclamation marks, and question marks, specifically ",", ".", "-", "/", "!", and "?", as break positions, it is possible to automatically break up the inside of the mail text and it becomes possible to obtain a grasp the general key points of the readout content while shortening the check (recognition) time.

Further, by making check of the readout voice and remote control operation through an earphone possible when using an earphone/microphone, operation of the mobile phone 10 for example while left in a handbag, check of the content of newly arrived mail while listening to the music by the mobile phone 10, check of information in a situation where the content of the screen must not be seen by third persons in the area, and so on can be realized by a simple operation.

Below, the configurations and functions of the different parts and audio readout control of the mobile phone 10 according to the present embodiment will be sequentially explained.

As shown in FIG. 1, the mobile phone 10 has a communication processing unit 11 including a transmission/reception antenna 111 and transmission/reception circuit 112, a memory 12, a key operation unit 13, a dial input unit 14, a sub display unit 15, a main display unit 16, an audio processing unit 17 including a speaker 171, microphone 172, and audio processing circuit 173, an open/close switch 18, a readout key input unit 19, a text-to-speech unit 20, a ringer speaker 21, switch circuits 22, 23, and 24, an external device connection unit 25, and a control unit (CPU) 26. Further, in FIG. 1, 30 indicates an earphone/microphone as an external connection device.

The earphone/microphone 30, as shown in FIG. 1, has a key operation unit 31 for the remote control operation, a speaker 32, and a microphone 33.

Further, as shown in FIG. 2A, a body case 100 of the mobile phone 10 is configured so that a first case comprised of a key input side body case 101 and a second case comprised of a display side body case 102 are connected by a not shown moveable mechanism and form the open/closed state.

The communication processing unit 11 performs a wireless communication operation via a base station, for example, a call operation of a phone number and transmission/reception operation of e-mail.

The communication processing unit 11 performs the wireless communication utilizing electric waves by modulating the audio information, e-mail, etc. processed at the control unit 26 and transmitting the same to a not shown base station by the transmission/reception antenna 113.

The transmission/reception circuit 112 demodulates various types of information wirelessly transmitted from the base station and received at the transmission/reception antenna 111 such as e-mail, short messages, and PTT calls and other audio information and outputs the same to the control unit 26.

PTT is an abbreviation of "Push to Talk". At the present, other than the normal voice conversation (all duplex communication), a communication system using semi-duplex communication to transmit the same audio and image data all together from one terminal to a plurality of terminals is being considered. This is called "PTT". For this PTT, when a sender makes a call, in the same way as the normal voice call, the reception of a call is notified.

The transmission/reception antenna 111 is built in the key input side body case 101 or the display side body case 102 and is not exposed to the external unit in FIG. 2A to FIG. 2D.

The memory (storage unit) 12 is configured by a nonvolatile memory such as an EEPROM and stores a control program for the transmission/reception of speech and mail, Internet browser, message data, address book in which names and phone numbers are registered, and so on.

The memory 12 stores an audio readout database including a text string required for the readout function explained later. This database is systematically arranged so that the text string for readout stands as a sentence in terms of surrounding context. The memory 12 stores the text of honorifics and address information.

The memory 12 stores "standard text", "shortened text", and "explanatory text" for each field of the menu displayed by the display unit.

The key operation unit 13 has an end (speech end)/power key, start (call) key, a plurality of ten keys corresponding to numbers, etc. By the operation of these keys by the user, the input information from the user is output to the control unit 26.

The dial input unit 14 is a dial type input unit arranged on the side surface of the display side body case 102 so that operation by a thumb of the user becomes easy when the user holds the mobile phone 10 in the opened state as shown in FIG. 2C. It is configured so that operation in the two up and down directions is possible.

By the operation with respect to the dial input unit 14, it becomes possible for the user to change an output volume of the audio and font size displayed at the sub display unit 15 and the main display unit 16.

Further, as clear from FIG. 2C and FIG. 2D, when comparing the dial input unit 14 in the closed state and opened state, the operation directions in the two up and down directions will physically reverse, but in the present embodiment, control by the control unit 26 explained later enables the operation direction seen from the user and the mode of operation with respect to the operation (for example the above volume change and change of the display font size) always coincide so as not to give a strange feeling to the user.

The sub display unit 15 has a display device such as liquid crystal display device (LCD) which is viewed by the user in the closed state as shown in FIG. 2B.

The main display unit 16 has a display device such as a liquid crystal display device (LCD) which is viewed by the user in the opened state as shown in FIG. 2A.

The sub display unit 15 and main display unit 16 display the text of the received e-mail and a variety of text data stored in the memory 12 in the closed state and opened state.

The audio processing unit 17 has an audio processing circuit 173. The speaker 171 for the audio output for the conversation function and a speaker 32 of the earphone/microphone 30 are selectively connected via a switch 22. The microphone 172 for the audio input and a microphone 33 of the earphone/microphone 30 are selectively connected via a switch 23.

The audio processing circuit 173 performs the predetermined processing with respect to the audio collected by the microphone 172 or the microphone 33 of the earphone/microphone 30 and supplies the same to the control unit 26. Further, the audio processing circuit 173 performs the predetermined processing with respect to the audio information supplied by the control unit 26 and outputs the same from the speaker 171 or the speaker 32 of the earphone/microphone 30.

As shown in FIG. 2A and FIG. 2B, the speaker 171 includes audio output units at two positions of a receiving speaker 171 and a ringer speaker 21 and basically outputs the audio of the processing result of the readout function by the ringer speaker 21.

The open/close switch 18 is a switch for detecting the open/closed state of the mobile phone 10.

As the concrete configuration of the open/close switch 18, a variety of techniques can be applied. For example, as shown in FIG. 2A, a configuration providing a contact unit in each of the key input side body case 101 and the display side body case 102, making both contacts electrically nonconductive in the closed state (FIG. 2B), and thereby turning off the device can be employed.

For example, by configuring the device so that the open/close switch 18 becomes the ON state when the mobile phone 10 is in the closed state and the open/close switch 18 becomes the OFF state when the mobile phone 10 is in the opened state and detecting the state of the open/close switch by the control unit 26, the open/closed state of the mobile phone 10 is judged.

The readout key operation unit 19 is configured by a pushbutton 19a arranged at the center of the display side body case 102 and an input circuit for the switch input by the button as shown in FIG. 2B.

The mobile phone 10 in the present embodiment has a readout function and is controlled by the control unit 26 so as to output audio by the ringer speaker 21 in for example the closed state when the pushbutton 19a is depressed (operated) and to output audio by the speech receiving speaker 171 in the opened state.

The control unit 26 judges the open/closed state of the mobile phone 10 according to the output of the open/close switch 18, then notifies the destination of the audio output for readout to the audio processing unit 17.

The control unit 26 makes the speaker 171 output the speech data synthesized at the text-to-speech unit 20 and generated through the audio processing unit 17 in for example the opened state.

The text-to-speech unit 20 converts the text data read out and extracted from the memory 12 to speech data at the control unit 26 at the time of readout.

The switch circuit 22 is connected at its fixed contact a to the input/output unit of the audio processing circuit 173, connected at its operation contact b to the microphone 172, and connected at its operation contact c to the microphone terminal 251 of the external device connection unit 25.

When the connection terminal of the earphone/microphone 30 is not connected (not inserted) to the external device connection unit 25, the switch circuit 22 connects the fixed contact a and the operation contact b under the control of the control unit 26 and makes the audio processing circuit 173 input the information picked up by the microphone 172.

When the connection terminal of the earphone/microphone 30 is connected (inserted) to the external device connection unit 25, the switch circuit 22 connects the fixed contact a and the operation contact c under the control of the control unit 26 and makes the audio processing circuit 173 input the information picked up by the microphone 33 of the external earphone/microphone 30.

The switch circuit 23 is connected at its fixed contact a to the input/output unit of the audio processing circuit 173, connected at its operation contact b to the speaker 171, and connected at its operation contact c to the speaker terminal 252 of the external device connection unit 25.

When the connection terminal of the earphone/microphone 30 is not connected (not inserted) to the external device connection unit 25, the switch circuit 23 connects the fixed contact a and the operation contact a under the control of the control unit 26 and makes the speaker 171 output the audio.

When the connection terminal of the earphone/microphone 30 is connected (inserted) to the external device connection unit 25, the switch circuit 23 connects the fixed contact a and the operation contact c under the control of the control unit 26 and makes the speaker 32 of the external earphone/microphone 30 output the audio.

The switch circuit 24 is connected at its fixed contact a to the output unit of the text-to-speech unit 20, connected at its operation contact b to the ringer speaker 21, and connected at its operation contact c to the speaker terminal 252 of the external device connection unit 25.

When the connection terminal of the earphone/microphone 30 is not connected (not inserted) to the external device connection unit 25, the switch circuit 24 connects the fixed contact a and the operation contact b under the control of the control unit 26 and makes the ringer speaker 21 output the synthesized audio.

When the connection terminal of the earphone/microphone 30 is connected (inserted) to the external device connection unit 25, the switch circuit 25 connects the fixed contact a and the operation contact c under the control of the control unit 26 and makes the speaker 32 of the external earphone/microphone 30 output the synthesized audio.

The external device connection unit 25 may have the connection terminal of the earphone/microphone 30 detachably connected to it and has a microphone terminal 251, a speaker terminal 252, and a signal terminal 253.

The microphone terminal 251 is connected to the operation contact c of the switch circuit 22 and the microphone 33 of the earphone/microphone 30. The speaker terminal 252 is connected to the operation contact c of the switch circuit 23 and the speaker 32 of the earphone/microphone 30. The signal terminal is connected to the control unit 26 and the key operation unit 31 of the earphone/microphone 30.

In the control unit 26, the connection terminal of the earphone/microphone 30 is connected to the external device connection unit 25. When recognizing the connection to the key operation unit 31, it performs control for switching the connection of the fixed contacts a of the switch circuits 22, 23, and 24 from the operation contacts b to the operation contacts c.

The control unit 26 is configured mainly by a microcomputer and performs the overall control of the mobile phone 10. For example, the control unit 26 performs control of the wireless transmission/reception of various types of information in the communication processing unit 11, the processing of audio information with respect to the audio processing unit, the control of the display of information to the main display unit 16, the processing in accordance with the input information of the key input unit 13, and the control for access to the memory 12.

When the user operates the pushbutton 19a, the control unit 26 executes the readout function of the displayed text. At that time, as the readout function, not the method of outputting the speech data for readout, but the text readout method of extracting/generating a text string and reading out the text is used.

The control unit 26 includes for example a text extraction unit 261 as shown in FIG. 1. The text extraction unit 261 extracts text from for example the menu and mailer stored in the memory 12 and the database of the browser according to the text extraction rule and supplies the same to the text-to-speech unit 20.

At that time, the control unit 26 sequentially scans the text string from the first word and supplies the text data to the text-to-speech unit 20 so as to synthesize audio in units of sentences while referring to the readout database in the memory 12 and considering the surrounding context in advance. Further, the control unit 26 performs controls so as to for example synthesize the audio in unit of sentences. According to this readout function, for example, change to a male voice, change to a female voice, and change of the readout speed are possible.

When outputting the speech data from the ringer speaker 21 (speaker 171) or the speaker 32 of the earphone/microphone 30 through the text-to-speech unit 20, the control unit 26 recognizes predetermined breaks from the text to be read out. When there is a predetermined instruction by the key operation unit 13 or the readout key operation unit 19, it performs controls so as to output the word from either the break position before or after the readout target text at the point of time of the input of instruction as the speech data.

In this case, the predetermined instruction instructed by the key operation unit 13 or the readout key operation unit 19 with respect to the control unit 26 is the operation of for example play-forward (skip) or play-backward (back skip) as shown in FIG. 3.

The control unit 26 performs control so as to output the data as speech data from the break position nearest the front from the point of time when the instruction occurs when the predetermined instruction is a fast forward (skip) instruction.

The control unit 26 performs controls so as to output the data as speech data from the break position nearest the back from the point of time when the instruction occurs when the predetermined instruction is a play-backward (back skip) instruction.

As these break positions, as previously explained, positions given the marks defined by JIS, for example, punctuation marks, exclamation marks, and question marks, specifically marks such as ",", ".", "-", "/", "!", and "?", are set as break positions. Due to this, it is possible to automatically break up the inside of the mail text and possible to obtain a grasp of the general key points of audio while shortening the check (recognition) time.

The control unit 26 further recognizes the components of e-mail and performs controls so as to treat the positions between the plurality of components as the break positions at the time of readout of e-mail in for example the case where e-mail is received through the communication unit 11.

Further, the control unit 26 performs controls so as to insert the text of the component of the name in the header of the text sandwiched at a break position of the above components at the time of readout of e-mail.

The memory 12 stores the text of honorifics and the address information. The control unit 26 can retrieve the sender name from the address information of the memory 12 for the component indicating the sender of the received e-mail and performs control so as to output the honorific when outputting the sender name by the audio output unit comprised of the speaker 21 etc. at the time of readout of a component indicating the sender of the e-mail.

The mobile phone 10, in addition to the audio readout function, can be connected to an external connection device comprised of the earphone/microphone 30 provided with an external operation unit externally connected to it and able to instruct the readout operation for remote control. The control unit 26 performs processing for controlling the routine for interruption of operation for remote control and controls the switch circuits 22 to 24 so as to switch the audio input/output to the earphone/microphone 30 when the earphone/microphone 30 is connected.

When the connection terminal of the earphone/microphone 30 is removed from the external device connection terminal 25, the control unit 26 controls the switch circuits 22 to 24 so as to switch the audio input/output by the built-in microphone 172, speaker 171, and ringer speaker 21.

When the earphone/microphone 30 is connected and call information is input through the communication processing unit 11, the control unit 26 makes the audio output unit comprised of the speaker 32 perform the call notification and makes the earphone/microphone 30 output the same, suspends the call notification when the key operation unit 31 of the earphone/microphone 30 is operated, and further perform controls so as to make the communication processing unit 11 start the connection processing of communication to the communication network.

The key operation unit 31 of the earphone/microphone 30 is configured by one or more keys.

The control unit 26, as will be explained in detail later, counts the number of times of the signal generated by the operation of the key of the key operation unit 31 of the earphone/microphone 30 within a predetermined time so as to judges a predetermined instruction. The predetermined instruction referred to here is the play-forward (skip) or play-backward (back skip) operation.

The control unit 26, for example, judges the instruction to be a skip when the key of the key operation unit 31 is operated one time as shown in FIG. 3(*a*) and judges it to be a back skip when the key is operated two times as shown in FIG. 3(*b*). Further, the control unit 26, as shown in FIG. 3(*c*), judges the operation not to be related to the present readout function, for example, to be a call response or hold cancellation, where there is the signal input over a predetermined time by the key operation unit 31.

When reading out text at a normal speed comprising a first speed and a play-forward instruction is given by the key operation unit 19, 13, or 31, the control unit 26 performs controls so as to read out the text from the point of time when the play-forward instruction occurs to the break position nearest the front at a second speed faster than the first speed and to return the speed to the first speed to read out the text from the break position.

When there is a first play-backward instruction given by the key operation unit 19, 13, or 31, the control unit 26 performs control so as to read out the break section at the point of time of this first operation instruction and return the readout target to one previous section when there is an instruction for a play-backward operation again within a predetermined time after the first operation instruction.

In the state where the sub display unit 15 or the main display unit 16 displays the text, the control unit controls the display units so that the font size of the displayed text is enlarged at the time of dial in the upward direction of the mobile phone 10 and so that the font size of the displayed text is reduced at the time of dial input in the downward direction of the mobile phone 1.

The word information is stored in the memory 12 as a scalable font or a plurality of fonts having different sizes, therefore the control unit 26 extracts the word information from the memory 12 and displays the same in each display unit.

Here, assume that the font of the text is displayed in the mobile phone 1 by setting the ringer speaker 21 side on the lower side in the state shown in FIG. 2B.

The control unit 26 performs the processing in accordance with the dial input from the dial input unit 14 and performs the reverse processing in accordance with the open/closed state of the mobile phone 1 at that time.

In general, the reverse processing is the processing for realizing the action as expected by the user irrespective of the open/closed state of the mobile phone 1 since the user expects the increase of the action for operation in the upward direction and the reduction of the action for operation in the downward direction for dial operations in the up and down directions.

Namely, when the mobile phone 1 performs the processing so that for example the font size is enlarged/reduced in accordance with the input in the up/down direction of the dial as explained above in the closed state of the mobile phone 1 (FIG. 2B), if no other processing is carried out, in the opened state of the mobile phone 10 (FIG. 2A), since the up/down position directions of the dial input unit 14 with respect to the user are reversed in comparison with the closed state, the font size is reduced in accordance with the input in the upward direction and the result of the action feels strange to the user.

Therefore, the control unit 26 judges the open/closed state of the mobile phone 10 based on the output of the open/close switch 18 and performs the reverse processing of actions with respect to the dial input unit 14 in accordance with the open/closed state. Due to this, when seen from the user, the device will always operate in the direction enlarging the font size by operation in the upward direction with respect to the dial input unit 14 and in the direction reducing the font size by operation in the downward direction with respect to the dial input unit 14 irrespective of the open/closed state of the mobile phone 10, therefore, there is no feeling of strangeness and the operation property is improved.

Next, the audio readout control of the mobile phone 10 according to the present embodiment will be specifically explained with reference to FIG. 4 to FIG. 10.

First, the fundamental operation of the readout operation according to the present embodiment will be explained with reference to FIG. 4 to FIG. 6.

Figure 4:
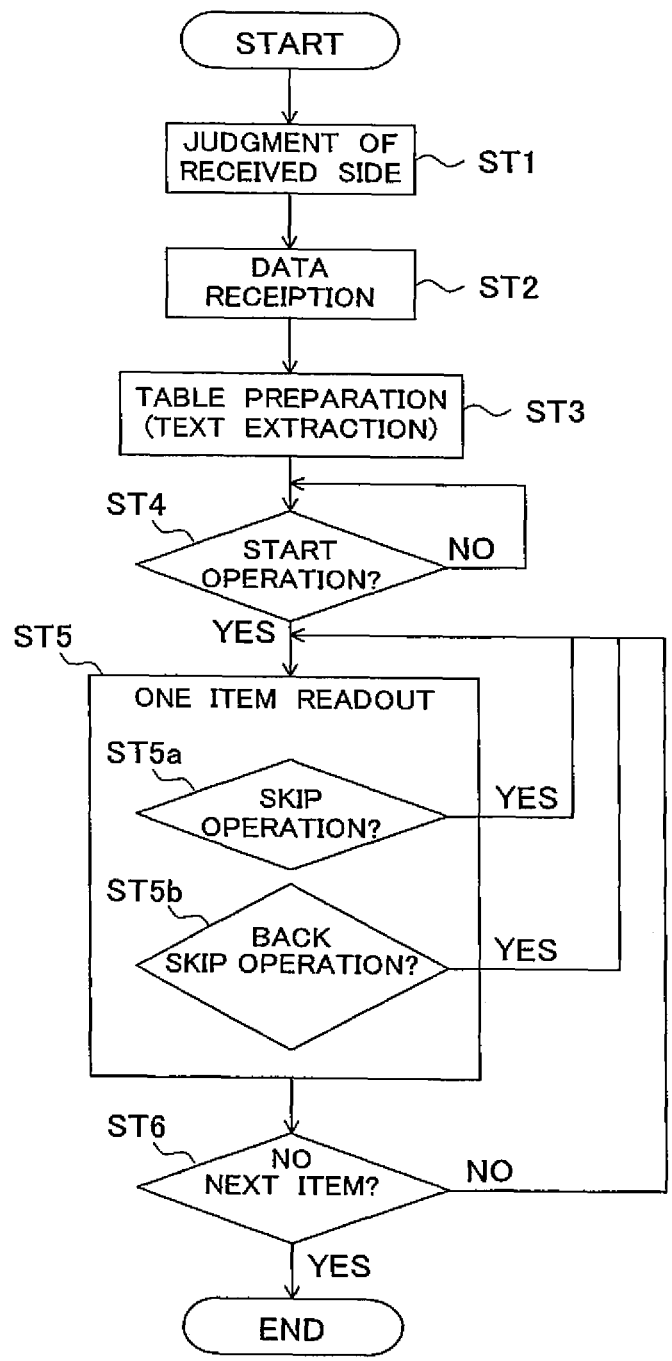
FIG. 4 is a flow chart for explaining a fundamental operation of a readout operation according to the first embodiment.

FIG. 4 is a flow chart for explaining the fundamental operation of the readout operation focusing on the control unit 26 according to the present embodiment. FIG. 5 is a diagram showing an example of the received data at the time of the readout operation and shows an example of the case where the data is received by the mailer. FIG. 6 is a diagram showing an example of a table prepared in the text extraction unit 261 based on the data received at the time of the readout operation.

Basically, the control unit 26 operates by changing to the readout enable state.

First, as the pre-processing of the readout, the control unit 26 judges the source of the data to be read out (ST1). The control unit 26 performs the judgment whether or not this source is a menu, mailer, or browser. In this example, it is assumed that the data is received from the mailer. Note that, the source is not limited to one unit. A combination of the menu and mailer etc. is permitted.

Next, the control unit 26 receives the data as shown in FIG. 5 (ST2) and prepares the table as shown in FIG. 6 (ST3).

Assume that the received data is for example the data as shown in FIG. 5.

Namely, the header is the text such as DATE: 2004/3/20, From (sender): Kyocera Taro, Subject (title): It's fine. The example of the text of FIG. 6 becomes "It's fine today, isn't it? Will tomorrow be fine too? Let's go out next time!". In this way, the text includes the punctuation mark ".", question mark "?", and exclamation mark "!".

At the time of table preparation, the control unit 26 prepares the text data for each field according to the rule in accordance with the data source.

Specifically, as the text data of "field number 1", "received Mar. 20, 2004" is prepared. The text data of field number 1 is prepared based on data such as "DATE: 2004/3/20" of the header of the received data. Note that the word "received" is underlined to indicate that the word is a standard format additional text for each field.

As the text data of "field number 2", "Sender Kyocera Tarosan" is prepared. This text data of field number 2 is prepared based on data such as "From: Kyocera Taro" of the header of the received data. Note that, the words of "Sender" and "san" are underlined to indicate that these words are standard format additional texts for each field. "san" is an honorific (Mr. or Ms., or Dr., Sir etc.) Note that when the component indicating the sender of the e-mail includes only the address information, preferably the CPU 26 omits the addition operation of the above honorific or performs the operation of adding the honorific after extracting the matching name by referring to the address book stored in the memory 21 of the mobile phone 10.

As the text data of "field number 3", "Subject: It's fine, isn't it?" is prepared. This text data of field number 3 is prepared based on the data such as "Subject: It's fine, isn't it?" of the header of the received data. Note that, the underline is attached to words of the "Subject" is underlined to indicate that the text is the standard format additional text for each field.

As the text data of "field number 4", "Text: It's fine today, isn't it?" is prepared. This text data of field number 4 is prepared based on the data such as "It's fine today, isn't it?" of the text of the received data. Namely, the punctuation mark "." is recognized as the break position, and the unit of this punctuation mark "." is determined as the break of the field. The word "Text" is underlined to indicate that this is the standard format additional text for each field.

As the text data of "field number 5", "Will tomorrow be fine too?" is prepared. This text data of field number 5 is prepared based on the data such as "Will tomorrow be fine too?" of the text of the received data. Namely, the question mark "?" is recognized as the break position, and the unit of this question mark "?" is determined as the break of the field.

As the text data of "field number 6", "Let's go out next time!" is prepared. This text data of field number 6 is prepared based on the data such as "Let's go out next time!" of the text of the received data. Namely, the exclamation mark "!" is recognized as the break position, and the unit of this exclamation mark "!" is determined as the break of field.

As the text data of "field number 7", "mail end" is prepared as the standard format additional text of the sentence end. The words "mail end" are underlined to indicate that the text is the standard format additional text for each field.

In the mobile phone 10 according to the present embodiment, the text corresponding to each field for audio output by the readout function (referred to as explanatory text) is held in the memory 12, the text corresponding to the selected field is supplied to the text-to-speech unit 20 in accordance with the operation with respect to the pushbutton 19a, the audio synthesizing processing is carried out here, and the text is output as audio by each one field from for example the ringer speaker 21 according to the table.

During the readout, when interruption processing by a skip operation instruction (play-forward instruction) or back skip operation instruction (play-backward instruction) is received from the key operation unit 13 or 19, the skip operation (ST5a) or back skip operation (ST5b) explained later is carried out.

Then, the operation ends at the point of time when the last field of the prepared table ("mail end" of number 7) is read out (ST6).

Next, the skip operation and back skip operation in the control unit 26 will be explained with reference to FIG. 7 and FIG. 8.

Figure 7:
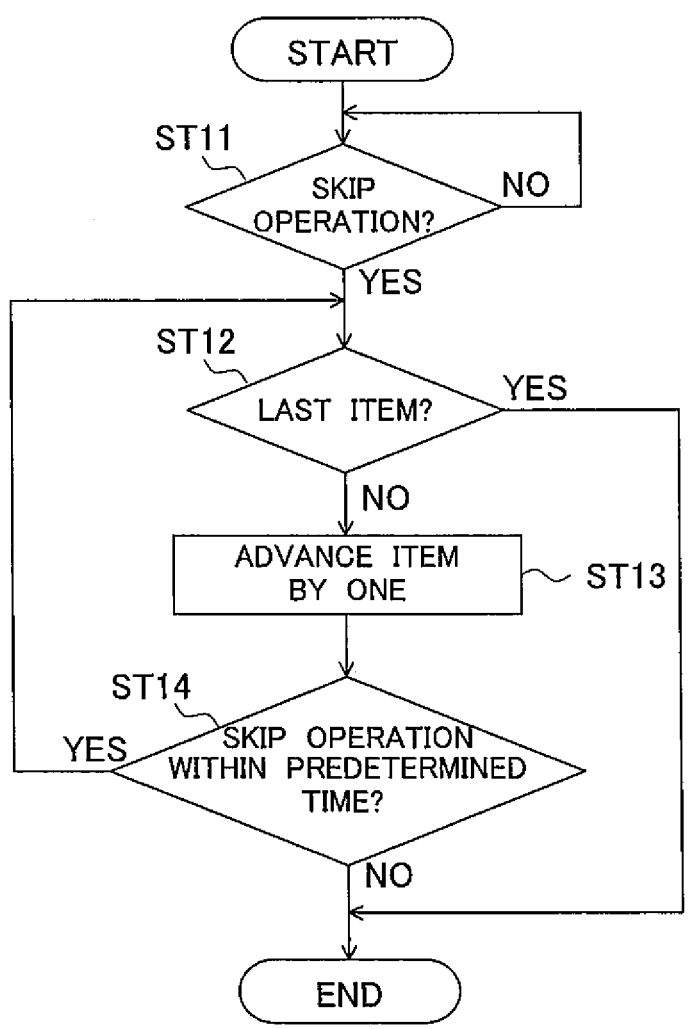
FIG. 7 is a flow chart for explaining the operation at the time of a skip operation according to the first embodiment.
Figure 8:
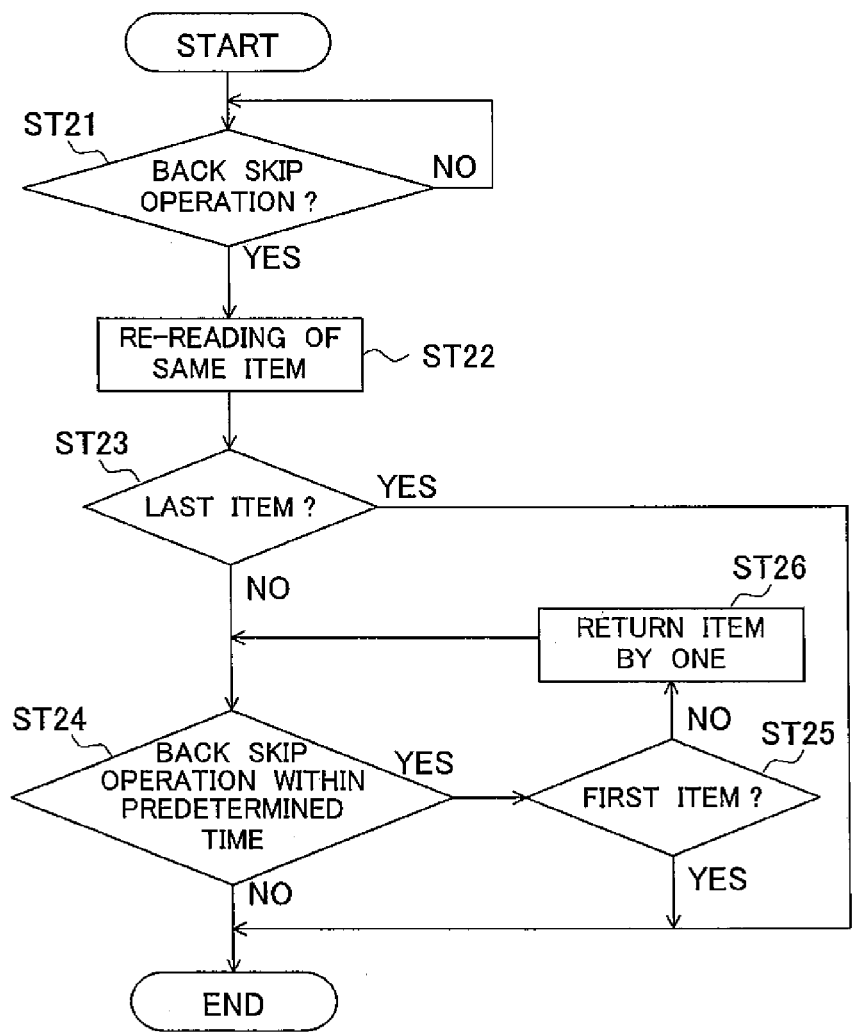
FIG. 8 is a flow chart for explaining the operation of a back skip operation according to the first embodiment.

FIG. 7 is a flow chart for explaining the operation at the time of the skip operation. FIG. 8 is a flow chart for explaining the operation of the back skip operation.

First, the operation at the time of the skip operation will be explained with reference to FIG. 7.

When receiving interruption processing by the skip operation instruction (play-forward instruction) from the key operation unit 13 or 19 (ST11) during readout, the control unit 26 judges whether or not the field to be skipped is the last field of the table (ST12).

When judging at step ST12 that the field is not the last field, the control unit 26 performs the processing for advancing the field by one, that is, skipping the present field (ST13).

Next, the control unit 26 judges whether or not interruption processing by a skip operation instruction (play-forward instruction) was received from the key operation unit 13 or 19 within a predetermined time (ST14).

At step ST14, where there is no skip operation instruction within the predetermined time, the control unit 26 ends the processing. On the other hand, when judging that a skip operation instruction is issued within the predetermined time, the control unit 26 returns to the processing of step ST12 where it judges whether or not the field to be skipped is the last field of the table (ST12).

The control unit 26 ends the processing when judging at step ST12 that the field is the last field, while advances the field by one from the processing of step ST13 when judging that the field is not the last field. Namely, the control unit 26 performs the processing of skipping the present field and shifts to the processing of step ST14.

Next, the operation at the time of the back skip operation will be explained with reference to FIG. 8.

When receiving interruption processing by a back skip operation instruction (fast play-backward instruction) from the key operation unit 13 or 19 during readout (ST21), the control unit 26 re-reads the same field (ST22), then judges whether or not the field to be back skipped is the first field of the prepared table (ST23).

When judging at step ST23 that the field is not the first field, the control unit 26 judges whether or not interruption processing by the back skip operation instruction (fast play-backward instruction) is received from the key operation unit 13 or 19 within a predetermined time (ST24).

The control unit 26 ends the processing where there is no back skip operation instruction within the predetermined time at step ST24. On the other hand, when judging that a back skip operation instruction is issued within the predetermined time, it proceeds to the processing of step ST25 where it judges whether or not the field to be skipped is the first field of the prepared table.

When judging at step ST25 that the field is not the first field, the control unit 26 performs the processing of returning the field by one, that is, back skipping the present field (ST26), and shifts to the processing of step ST24.

The control unit 26 ends the processing when judging at step ST25 that the field is not the first field.

Next, the control operation where the connection terminal of the external connection device comprised of the earphone/microphone 30 is connected to the external device connection unit 25 will be explained with reference to the flow charts of FIG. 9 and FIG. 10.

Figure 9:
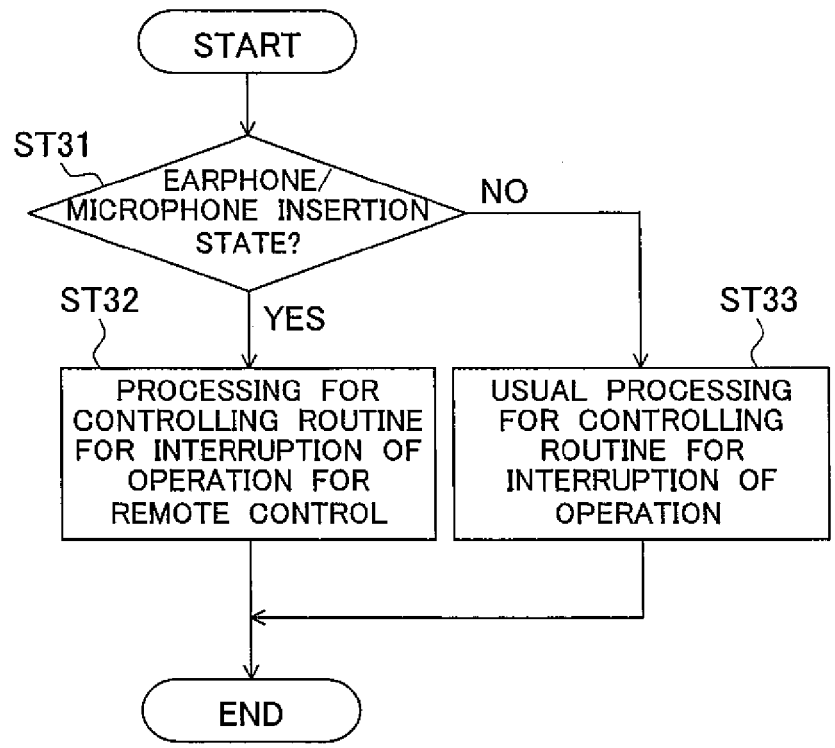
FIG. 9 is a flow chart for explaining a control operation where a connection terminal of an external connection device such as an earphone/microphone is connected to an external device connection unit according to the first embodiment.

The control unit 26 judges whether or not the connection terminal of the external connection device comprised of the earphone/microphone 30 is connected to the external device connection unit 25 as shown in FIG. 9 (ST31).

When judging at step ST31 that the connection terminal of the earphone/microphone 30 is connected to the external device connection unit 25, the control unit 26 performs the processing for controlling the routine for interruption of operation for remote control (ST32). When judging at step ST31 that the connection terminal of the earphone/microphone 30 is not connected to the external device connection unit 25, the control unit 26 performs the normal processing for controlling the routine for interruption of operation (ST33).

Figure 10:
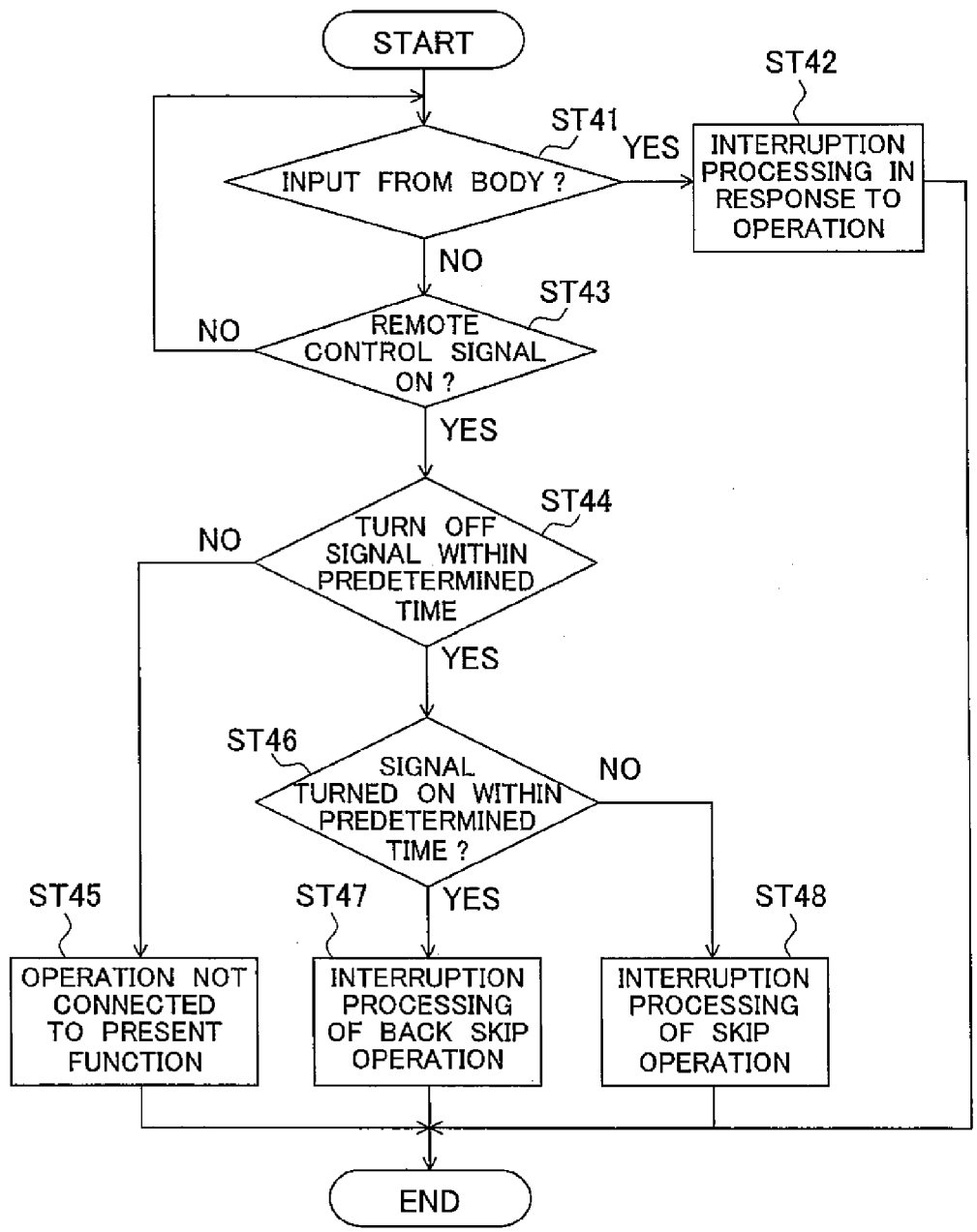
FIG. 10 is a flow chart for explaining the control operation where a connection terminal of an external connection device such as an earphone/microphone is connected to an external device connection unit according to the first embodiment.
Figure 11:
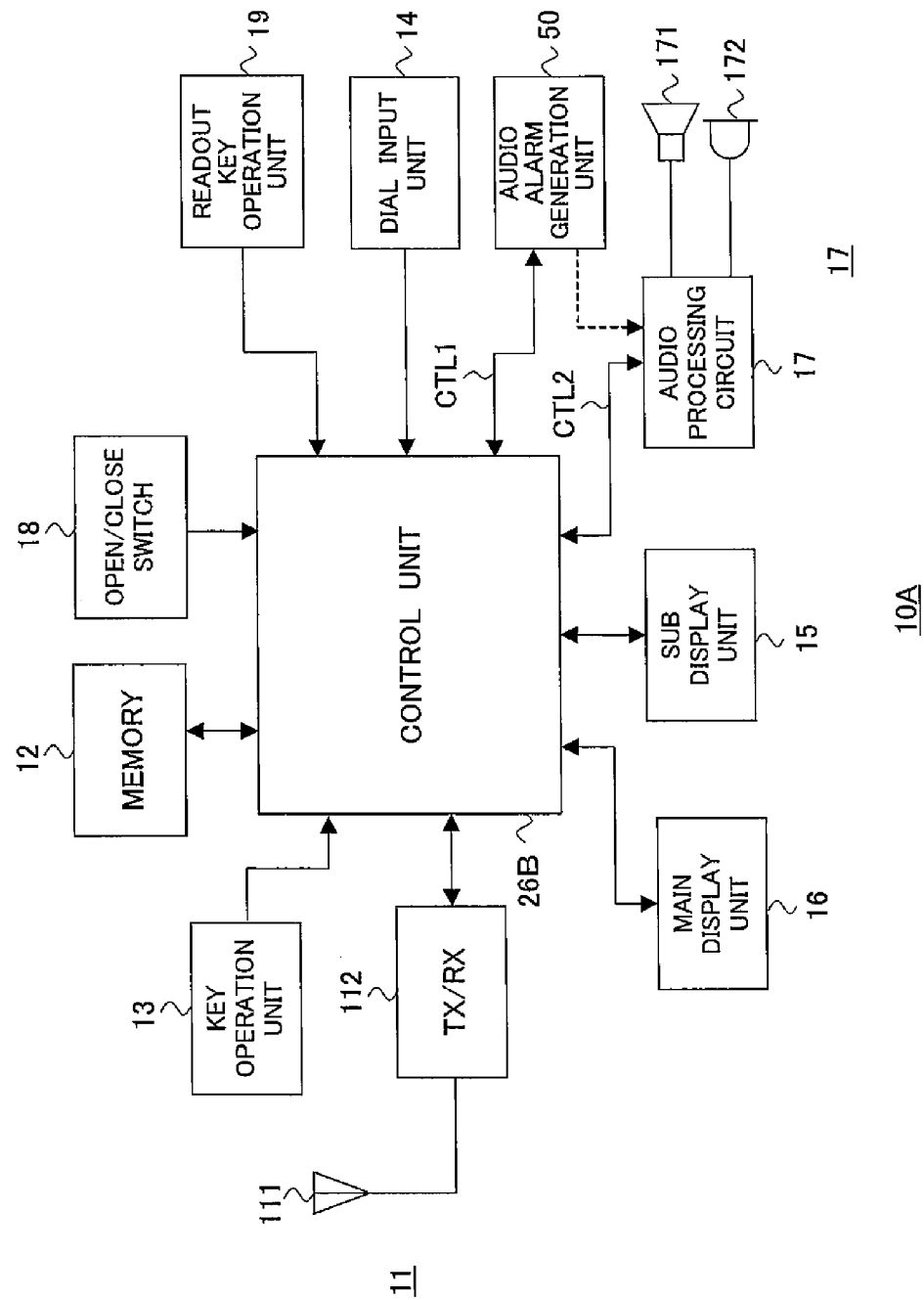
FIG. 11 is a block diagram illustrating an example of the system configuration of a mobile phone of a second embodiment.

In the processing for controlling the routine for interruption of operation for remote control, as shown in FIG. 10, the control unit 26 judges whether or not there is input from the key operation unit of the main body (ST41) and performs the interruption processing in response to the operation when it exists (ST42).

When judging at step ST41 that there is no input from the key operation unit of the main body, the control unit 26 judges whether or not the remote control signal is input (made ON) from the key operation unit 31 of the earphone/microphone 30 (ST43).

When judging at step ST43 that the remote control signal is ON, the control unit 26 judges whether or not the remote control signal becomes OFF in a predetermined time after turning ON (ST44).

When judging at step ST44 that the remote control signal does not become OFF, the control unit 26 judges that the operation is not concerned with the present readout function, for example, is a call response or hold cancellation, since there is a signal input over a predetermined time by the key operation unit 31 (ST45).

When judging at step ST44 that the remote control signal becomes OFF, the control unit 26 judges whether or not the remote control signal becomes ON within a predetermined time by the key operation unit 31 (ST46).

When judging at step ST46 that the remote control signal is made ON again within a predetermined time, the control unit 26 judges that a back skip operation instruction is made and performs the above back skip operation interruption processing (ST47).

When judging at step ST46 that the remote control signal is not made ON again within the predetermined time, the control unit 26 judges that the skip operation instruction is made and performs the above skip operation interruption processing (ST48).

Further, when the earphone/microphone 30 is connected, the control unit 26 makes the speaker 32 perform the call notification when call information is input through the communication processing unit 11 and makes the earphone/microphone 30 output the same.

In parallel with this, the control unit 26 suspends the call notification and makes the communication unit 11 start the connection processing of communication to the communication network when the key operation unit 31 of the earphone/microphone 30 is operated.

Further, the control unit 26 prepares a table of the newly arrived mail when receiving newly arrived mail when the earphone/microphone 30 is connected.

Here, an explanation will be given of the table of the newly arrived mail when the earphone/microphone is connected. Basically, the preparation of the table was explained with reference to FIG. 5 and FIG. 6, but when the earphone/microphone is connected, a readout function further convenient for the user can be achieved by changing this operation a little.

Usually, when mail newly arrives, a display such as "newly arrived mail" is made on the standby screen. The display of this "newly arrived mail" is particularly the display of the text extracted from the database of the menu stored in the memory 21 on the sub display unit 15 when the control unit 26 newly detects the reception of mail. Here, when the user opens the terminal device, the display of "newly arrived mail" is switched to the main display unit 16 due to the change of the signal of the open/close switch 18.

When the operation of opening the newly arrived mail is carried out at the key operation unit 13 in this state and the readout is instructed by the readout key operation unit 19, the preparation of the table as explained with reference to FIG. 5 and FIG. 6 is performed.

Contrary to this, when the earphone/microphone 30 is connected, at the time of the preparation of the table as explained with reference to FIG. 5 and FIG. 6, "newly arrived mail" of the text extracted from the database of the menu is first added to the text data at the header of the field numbers and the following field numbers are shifted one by one to the lower positions to prepare a table. Due to this, in the state when there is newly arrived mail, even when the key operation unit 13 is not operated, if the forwarding (skip) operation is carried out, even the content of the newly arrived mail can be immediately checked.

Note that such a table preparation operation including a menu was explained in only the state where the earphone/microphone 30 was connected, but the present invention is not limited to this.

For example, when the readout key operation unit 19 is configured so as to be exposed in the state where the mobile terminal device, in this case the mobile phone 10, is closed, the table preparation operation including also the menu may be carried out as explained above when the readout operation unit 19 is operated in the state where the mobile terminal device is closed.

Due to this, the readout such as "newly arrived mail" is output from the ringer speaker 21 etc. even when the mobile terminal device is not opened, so it becomes able to perform a series of content checking operations.

As explained above, according to the present embodiment, the device is provided with the operation unit 19 for instructing the readout operation, the memory 12 for storing the text, the text-to-speech unit 20 for converting the text data stored in the memory 12 to speech data when readout is carried out, the audio output unit 21 for outputting the speech data, and the control unit 26 for recognizing predetermined breaks from the text to be read out when outputting the speech data at the audio output unit 21 and performing control so as to output words from either the break position before or after the readout target text at the point of time of the instruction input as the speech data from the speaker as the audio output unit when a predetermined instruction is made by the operation unit 19, therefore the following effects can be obtained.

In the audio readout function, it becomes possible for the user to pick up and delete information in accordance with the degree of importance, so the readout function can be efficiently utilized.

Further, a mailer, browser, menu display, or other such applications etc. managing the display of information can be used as the source of the text information. Transfer in units of meaning when displayed on the screen display such as single pieces of mail becomes possible.

Further, fields of the read out text can be extracted according to a previously determined rule. Even the case of data such as e-mail where the content cannot be previously predicted can be automatically handled. Therefore, the work of the user setting the break positions by himself can be lightened.

The already existing earphone/microphone interface can be used for output of the readout audio and remote control operation, so a reduction of cost and size of the terminal and operation considering privacy are enabled.

Since operation such as checking mail is enabled without viewing the screen almost at all, use not only in situations where visibility is poor, but also use while turning off the screen display in situations where third parties should not be allowed to see the screen are possible.

Further, there is the advantage that when new mail is received while using the earphone/microphone for a purpose other than the audio readout, for example, playing back music, the newly arrived mail can be checked by a simple hand operation without opening a so-called flip-open type terminal device.

Further, when checking the content of mail, since there is private information, even when there would be a demerit at the time of audio readout, the audio is not leaked to the surroundings, therefore it is possible to use the mobile phone without problem.

Further, according to the mobile phone 10 of the present embodiment, by operation with respect to the dial input unit 14, the words of the displayed text can be enlarged/reduced. Therefore, the viewability of the text is improved. At the same time, when enlarging/reducing words of the text, processing in accordance with the display format of the text is carried out, therefore the viewability and user friendliness of the operation are further improved.

Second Embodiment

A second embodiment of the mobile terminal device of the present invention will be explained with reference to FIG. 11 to FIG. 18.

The second embodiment of the present invention relates to a mobile terminal device with which the user can set the audio alarm before readout without a troublesome operation and in addition which can generate the audio alarm only when it is necessary.

The mobile terminal device 10A illustrated in FIG. 11 and FIG. 12A to FIG. 12D differs from the mobile terminal device 10 illustrated in FIG. 1 and FIG. 2A to FIG. 2S in that an audio alarm generation unit 50 is added and the external connection unit 25 is deleted. The rest of the components are substantially the same between the mobile terminal device 10 of the first embodiment and the mobile terminal device 10A of the second embodiment. Note that the control unit 26 of the first embodiment and a control unit 26A of the second embodiment differ in processing contents as will be explained below.

Below, the characteristic features (differences) of the mobile terminal device 10A of the second embodiment will basically be explained.

The mobile terminal device 10A according to the present embodiment has an audio readout function in addition to the usual functions of a mobile phone and is configured so as to draw the attention to the user (listener) side and obtain a psychological effect by issuing an audio alarm before readout when the mobile phone 10A receives a readout instruction.

The mobile phone 10A issues an audio alarm only under situations where the audio readout function is set to "auto" and it is necessary to inform the user of a particularly important status such as the strength of the electric waves and the remaining level of the battery life.

In the mobile phone 10A according to the present embodiment, when receiving a call or when receiving mail at the time of readout, the usual audio alarm is not issued, that is, the usual vibration, incoming call song, or incoming call melody is deemed for use as the audio alarm before the readout time. Namely, the mobile phone 10A is configured so as not to issue such an audio alarm until in a situation where it can be clearly heard.

Note that, the mobile phone is configured so that the user can instantaneously judge that his own terminal device is reading out by being able to the audio alarm by himself.

In the mobile phone 10A according to the present embodiment, as will be explained in detail later, there are the following two points concerning the conditions of "audio alarm generation".

The first is the point that the audio alarm is generated with reference to the condition table.

The second is the point of the improvement of the convenience to the user by previously giving not fixed settings such as a condition table, but numerical values weighting matters (events), having the user judge in which range to issue the audio alarm by comparing the weighting value of the weighting table and the setting of the user, and thereby controlling issuance and nonissuance of the audio alarm.

Below, the configurations and functions of the different parts and the readout control of the mobile phone 10A according to the present embodiment will be sequentially explained.

The operation of the key operation unit 13 enables whether or not to read out fields of the control table of the audio readout function stored in the memory 12 to be set through the control unit 26A (ON/OFF).

The operation of the key operation unit 13 enables the weighting values of the fields of the weighting table of the audio readout function stored in the memory 12 to be set through the control unit 26A.

The audio processing unit 17 has an audio processing circuit 173 to which a speaker 171 for the audio output and a microphone 172 for the audio input for the speech function are connected.

The audio processing unit 17 performs the predetermined processing with respect to the audio picked up by the microphone 172 and supplies the same to the control unit 26A. Further, the audio processing unit 17 performs the predetermined processing with respect to the audio information supplied by the control unit 26A and makes the speaker 171 output the same.

The speaker 171 includes two audio output units of a speech receiving speaker 171a and a ringer speaker 171b and outputs the audio of the processing result of the readout function.

Further, the audio processing unit 17 converts the text data read out and extracted from the memory 12 in the control unit 26A to speech data at the time of readout and synthesizes the audio at the audio output unit comprised of the speech receiving speaker 171a or the ringer speaker 171b and outputs the same.

The audio processing unit 17 makes the audio output unit output the audio alarm in accordance with the reason for the readout start and then outputs the speech data when making the audio output unit output the speech data synthesized by the speech receiving speaker 171a or the ringer speaker 171b under the control of the second control routine signal CTL2 by the control unit 26A at the time of audio readout.

The audio alarm generation unit 50 receives the first control routine signal CTL1 from the control unit 26A, generates an audio alarm, for example, an audio alarm "beep", and supplies the same to the audio synthesizing processing unit 17 through the control unit 26A or directly.

When the user operates the pushbutton 19a, the control unit 26A executes the readout function of the displayed text. At that time, as the readout function, not the method of outputting the speech data for the readout, but the text readout method of extracting/generating the text string and reading out the text is used.

When outputting the speech data, the control unit 26A outputs the second control routine signal CTL2 to the audio processing unit 17 so as to generate the audio alarm by the control signal CTL1 in accordance with the reason of the readout start, output the audio alarm from the speaker as the audio output unit, then output the speech data.

In other words, when outputting the speech data, the control unit 26A performs controls so as to convert the text to the speech data by the second control routine signal CTL2 after generating the audio alarm by the first control routine signal CTL1 in accordance with the reason of the readout start.

The control unit 26A makes the audio output unit comprised of the speaker 172 output the speech data after an elapse of the predetermined time after outputting the audio alarm.

Namely, the control unit 26A makes the audio alarm generation unit 50 generate the audio alarm by the first control routine signal CTL, then, after an elapse of a predetermined time, makes the audio synthesizing processing unit 17 generate the speech data by the second control routine signal CTL2.

Further, the control unit 26A does not make the audio output unit comprised of the speaker 172 output the speech data when there is the input from the key operation unit 13 in a predetermined time.

The key operation unit 13 is linked with predetermined processing. When there is input from the key operation unit 13 in a predetermined time, the control unit 26A performs control only for preventing the audio output unit comprised of the speaker 172 from outputting the speech data and does not perform the predetermined processing.

Further, the control unit 26A judges whether the reason for the readout start is the readout instruction according to the readout key operation unit 19 or the automatic readout in accordance with the change in state inside the terminal. This automatic readout is based on for example the remaining level of the battery life or the change of the electric wave situation.

At the time of this automatic readout, the control unit 26A refers to the control table of the audio readout function stored in the memory 12.

FIG. 13 is a diagram showing an example of the control table according to the present embodiment.

In the example of FIG. 13, as the categories of the automatic readout, the table is divided into the remaining level of battery life, the electric wave situation, etc.

The mobile phone 10A receives the supply of power from a not shown secondary battery (hereinafter referred to as a "battery"). The control unit 26A obtains a grasp of the remaining level of the battery life by constantly monitoring the voltage value of the battery. A battery flag is set according to if this battery voltage value is a predetermined threshold value or more. This threshold value is set at a plurality of levels. Based on this, in a sequence from battery life having the smallest remaining level, battery flags 0, 1, 2, and 3 are designated. They are displayed in the display units 15 and 16.

The battery situation is displayed on the display units 15 and 16 as the battery flags 0, 1, 2, or 3 and determines whether or not readout is to be carried out.

When the battery flags are 0 and 1, the control unit 26A controls the issuance of the audio alarm and controls the readout according to the control table so as to read out "remaining level of battery life small" etc. to inform the user that the remaining level of the battery life is extremely small.

According to the control table, when the battery flags are 2 and 3, the control unit 26A deems that it is not necessary to inform the user of the remaining level of the battery life and therefore does not perform the readout control.

Further, the mobile phone 10A always performs the operation for securing communication with the neighboring base station by transmitting/receiving a wireless signal through the antenna 111 by the transmission/reception circuit 112. Here, by the movement of the mobile phone 10A and the change of the peripheral environment, the intensity of the electric wave from the base station when seen from the mobile phone 10A changes every moment. The control unit 26A provides a plurality of threshold values also for this intensity of electric wave and designates an electric wave mark 0 to 3 for each. Further, where the lowest limit intensity of electric wave enabling communication cannot be obtained, the phone is designated as being outside the area of service. This is displayed on the display units 15 and 16.

The electric wave situation is displayed on the display units 15 and 16 as being outside the area of serve, electric wave 0, electric wave 1, electric wave 2, or electric wave 2 and determines whether or not the readout is to be carried out.

According to the content of the control table, when the electric wave is outside the area of service, electric wave 0, or electric wave 1, the control unit 26A performs the control for generation of the audio alarm and the control for readout so as to read out "electric wave situation bad at the present location" to inform the user that the electric wave situation is extremely bad.

According to the control table, when the electric wave is the electric wave 2 or the electric wave 3, the control unit 26A deems that it is not necessary to notify the user of the electric wave situation and does not perform the readout control.

In addition, the states are divided into the time of completion of charging, during conversation, time of recovery of the electric wave situation, call reception, mail reception (reception sound is audio alarm in this case), unread mail, and recorded messages.

According to the control table, in the case of the time of completion of charging, during conversation, time of recovery of the electric wave situation, call reception, or mail reception (reception sound is audio alarm in this case), the control unit 26A performs control for generation of the audio alarm and the control for readout so as to inform the user of such a fact.

According to the control table, in the case of unread mail and a recorded message, the control unit 26A does not perform the readout control.

The control unit 26A does not perform the audio readout control during the silent mode, drive mode, and key lock.

At the time of this automatic readout, the control unit 26A refers to the weighting table of the audio readout function stored in the memory 12.

The control unit 26A judges whether or not to carry out the automatic readout in accordance with the weighting value of the weighting table.

FIG. 14 is a diagram showing an example of the weighting table according to the present embodiment.

In the example of FIG. 14, the categories of the automatic readout are the remaining level of the battery life and the electric wave situation.

The battery situation is for example displayed on the display units 15 and 16 as the battery flags 0, 1, 2, and 3 and determines whether or not the readout is to be carried out while changing the weight value.

According to the control table, in the case of the weighting values of 4 and 3 and the battery flags 0 and 1, the control unit 26A performs control for generation of the audio alarm and control for readout so as to read out "remaining level of battery life small" to inform the user that the remaining level of battery life is extremely small.

According to the control table, in the case of the weighting values of 2 and 1 and the battery flags 2 and 3, the control unit 26A deems that it is not necessary to inform the user of the remaining level of battery life and does not perform the readout control.

The electric wave situation is displayed on the display units 15 and 16 as being outside the area of serve, electric wave 0, electric wave 1, electric wave 2, or electric wave 2 and determines whether or not the readout is to be carried out while changing the weighting values.

According to the content of the control table, when the weighting values are 5, 4, and 2 and the electric wave is outside the area of service, electric wave 0, or electric wave 1, the control unit 26A performs the control for generation of the audio alarm and the control for readout so as to read out "electric wave situation bad at the present location" to inform the user that the electric wave situation is extremely bad.

According to the control table, when the weighting value is 2 or 1 and the electric wave is the electric wave 2 or the electric wave 3, the control unit 26A deems that it is not necessary to notify the user of the electric wave situation and does not perform the readout control.

The control unit 26A issues an instruction to the audio processing unit 17 for generating an audio notification when the processing for receiving information or a call from the communication network occurs through the communication processing unit 11.

The control unit 26A makes the audio output unit output the audio alarm when the reason of the read start is the occurrence of processing for receiving information or a call and the audio notification is output at the audio output unit comprised of the speaker 172.

The control unit 26A includes a not shown text extraction unit. The text extraction unit 261 extracts the text from the for example menu, mailer, browser, or other database stored in the memory 12 according to a text extraction rule and supplies the same to the audio synthesizing processing unit 17.

At that time, the control unit 26A sequentially scans the text string from the first word and supplies the text data to the text-to-speech unit 20 so as to synthesize audio in units of sentences while referring to the readout database in the memory 12 and considering the surrounding context in advance. Further, the control unit 26A performs controls so as to for example synthesize the audio in unit of sentences. According to this readout function, for example, change to a male voice, change to a female voice, and change of the readout speed are possible.

Further, in the state where the sub display unit 15 or the main display unit 16 displays the text, the control unit controls the display units so that the font size of the displayed text is enlarged at the time of dial in the upward direction of the mobile phone 10A and so that the font size of the displayed text is reduced at the time of dial input in the downward direction of the mobile phone 10A.

The word information is stored in the memory 12 as a scalable font or a plurality of fonts having different sizes, therefore the control unit 26 extracts the word information from the memory 12 and displays the same in each display unit.

Here, assume that the font of the text is displayed in the mobile phone 10A by setting the ringer speaker 21 side on the lower side in the state shown in FIG. 12B.

The control unit 26A performs the processing in accordance with the dial input from the dial input unit 14 and performs the reverse processing in accordance with the open/closed state of the mobile phone 10A at that time.

In general, the reverse processing is the processing for realizing the action as expected by the user irrespective of the open/closed state of the mobile phone 10A since the user expects the increase of the action for operation in the upward direction and the reduction of the action for operation in the downward direction for dial operations in the up and down directions.

Namely, when the mobile phone 10A performs the processing so that for example the font size is enlarged/reduced in accordance with the input in the up/down direction of the dial as explained above in the closed state of the mobile phone 10A (FIG. 12B), if no other processing is carried out, in the opened state of the mobile phone 10A (FIG. 12A), since the up/down position directions of the dial input unit 14 with respect to the user are reversed in comparison with the closed state, the font size is reduced in accordance with the input in the upward direction and the result of the action feels strange to the user.

Therefore, the control unit 26A judges the open/closed state of the mobile phone 10A based on the output of the open/close switch 18 and performs the reverse processing of actions with respect to the dial input unit 14 in accordance with the open/closed state. Due to this, when seen from the user, the device will always operate in the direction enlarging the font size by operation in the upward direction with respect to the dial input unit 14 and in the direction reducing the font size by operation in the downward direction with respect to the dial input unit 14 irrespective of the open/closed state of the mobile phone 10A, therefore, there is no feeling of strangeness and the operation property is improved.

Next, the audio readout control of the mobile phone 10A according to the present embodiment will be specifically explained with reference to FIG. 15 to FIG. 18.

First, the fundamental operation of the readout operation in the control unit 26A according to the present embodiment will be explained with reference to FIG. 15.

Figure 15:
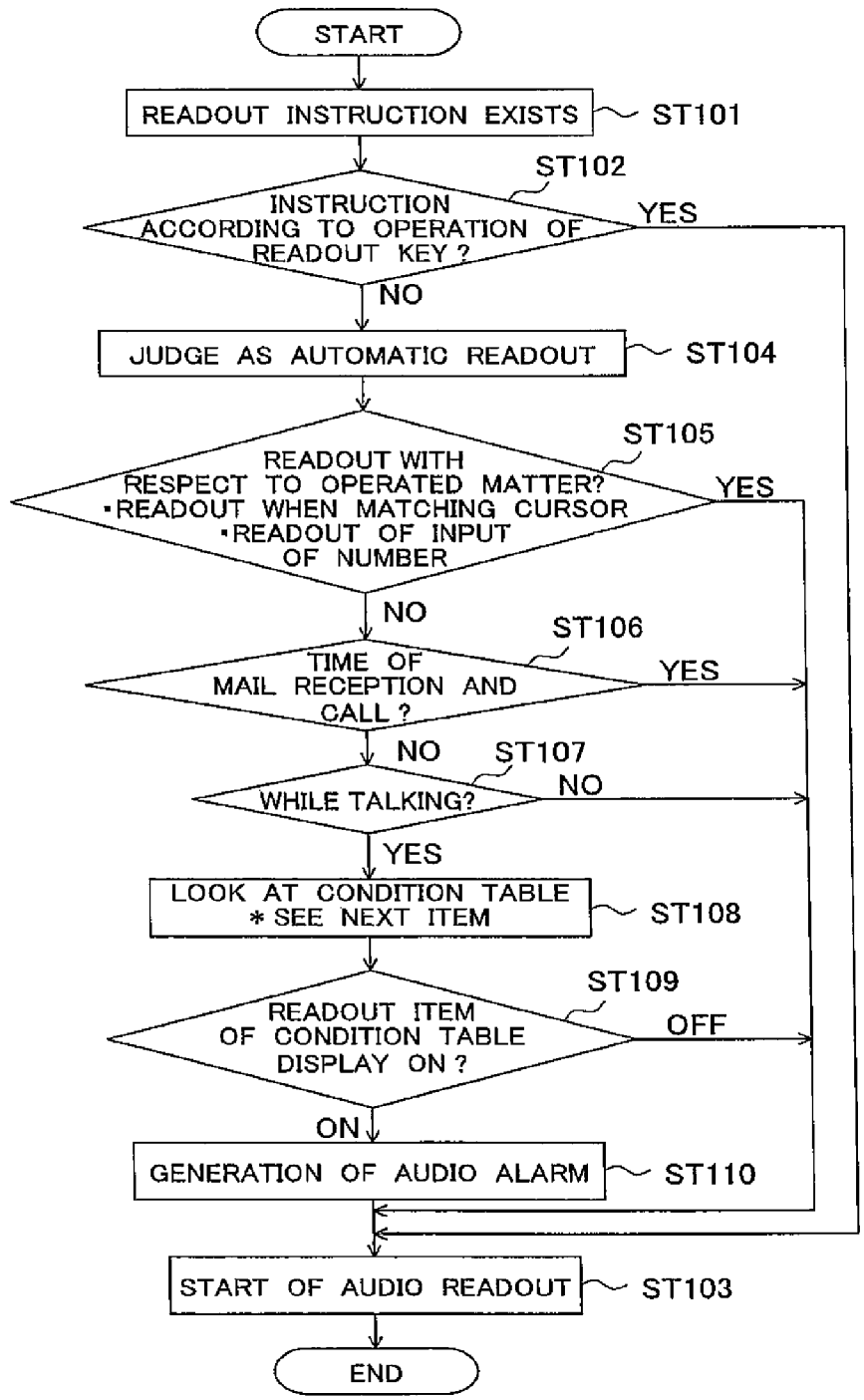
FIG. 15 is a flow chart for explaining a fundamental operation of a readout operation according to the second embodiment.

FIG. 15 is a flow chart for explaining the fundamental operation of the readout operation of the control unit 26A according to the present embodiment.

Basically, the routine starts by the transition to the readout enable state.

First, when an operation of the readout key operation unit 19 or any event, for example, the readout and notification of the remaining level of battery life or electric wave situation, occurs (ST101), the control unit 26A first judges whether or not the readout instruction is based on the operation of the readout key operation unit 19 (ST102).

When judging at step ST102 that the readout instruction is based on an operation of the readout key operation unit 19, the control unit 26A extracts the desired text from the memory 12 and outputs the control signal CTL2 to the audio synthesizing processing unit 17 which then generates the speech data by the audio synthesis and outputs the speech data (ST103). In this case, since the operation is according to the intent of the user, the audio alarm is not generated.

When judging at step ST102 that the readout instruction is not based on an operation of the readout key operation unit 19, the control unit 26A judges that the operation is according to the automatic readout (ST104) and judges whether or not it is readout with respect to an operation in progress, specifically the readout when aligning the cursor or the readout of an input of a number (ST105).

When judging at step ST105 that the readout is made with respect to an operation in progress, the control unit 26A does not generate the audio alarm since the operation is according to the intent of the user and starts the audio readout at step ST103. Namely, the control unit 26A extracts the desired text from the memory 12 and outputs the control signal CTL2 to the audio synthesizing processing unit 17 which generates the speech data by audio synthesis and outputs the speech data.

When judging at step ST105 that the readout is not readout with respect to an operation in progress, the control unit 26A judges whether or not mail or a call has been received (ST106).

When judging at step ST106 that mail or a call has been received, the control unit 26A does not generate the audio alarm since the user hears a mail or call reception sound and starts the audio readout at step ST103. Namely, the control unit 26A extracts the desired text from the memory 12 and outputs the control signal CTL2 to the audio synthesizing processing unit 17 which generates the speech data by audio synthesis and outputs the speech data.

When judging at step ST106 that mail or a call has not been received, the control unit 26A judges whether or not the user is in the middle of a call (ST107).

When judging at step ST107 the user is in the middle of a call, the audio alarm is not necessary, therefore the control unit 26A does not generate the audio alarm and starts the audio readout at step ST103. Namely, the control unit 26A extracts the desired text from the memory 12 and outputs the control signal CTL2 to the audio synthesizing processing unit 17 which generates the speech data by audio synthesis, adjusts the volume, and outputs the speech data together with the voice of the other party to the call.

When judging at step ST107 that the user is not in the middle of a call, the control unit 26A refers to the control table or the weighting table comprised of the condition table (ST108).

The control unit 26A judges whether or not the readout field of the condition table is ON (ST109).

When judging at step ST109 that the field is not ON (OFF), the audio alarm is not necessary, therefore the control unit 26A does not generate the audio alarm and starts the audio readout at step ST103. Namely, the control unit 26A extracts the desired text from the memory 12 and outputs the control signal CTL2 to the audio synthesizing processing unit 17 which generates the speech data by audio synthesis and outputs the speech data.

When judging at step ST109 that the field is ON, the audio alarm is necessary, therefore the control unit 26A generates the audio alarm by the first control routine signal CTL1 (ST110), then performs control so as to convert the text to the speech data by the second control routine signal CTL2.

Specifically, after the elapse of a predetermined time after outputting the audio alarm, the audio readout is started at step ST103. Namely, the control unit 26A extracts the desired text from the memory 12 and outputs the control signal CTL2 to the audio synthesizing processing unit 17 which generates the speech data by audio synthesis and outputs the speech data.

By starting the audio readout after the elapse of the predetermined time in this way, it is also possible to avoid problems such as the audio alarm being superimposed on the readout audio even when the audio alarm output at the audio output unit 171 is a sound including a residual sound etc. or the supplied sound source abruptly switching from the audio alarm generation unit 50 to the synthesized sound of the audio synthesizing processing unit 17 and a not shown amplifier circuit of audio not being able to keep up with the change of amplification rate.

Figure 16:
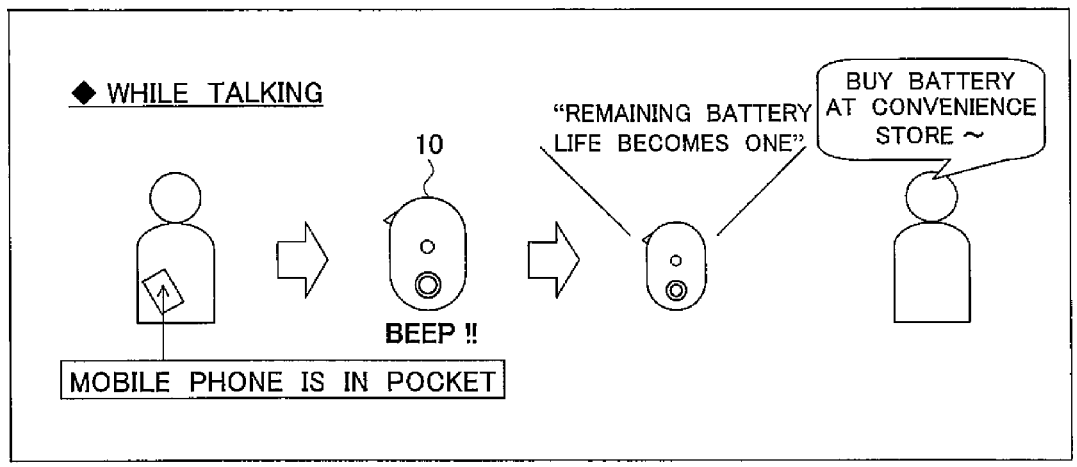
FIG. 16 is a diagram showing a use scene of an audio readout function while the user is walking of the second embodiment.
Figure 17:
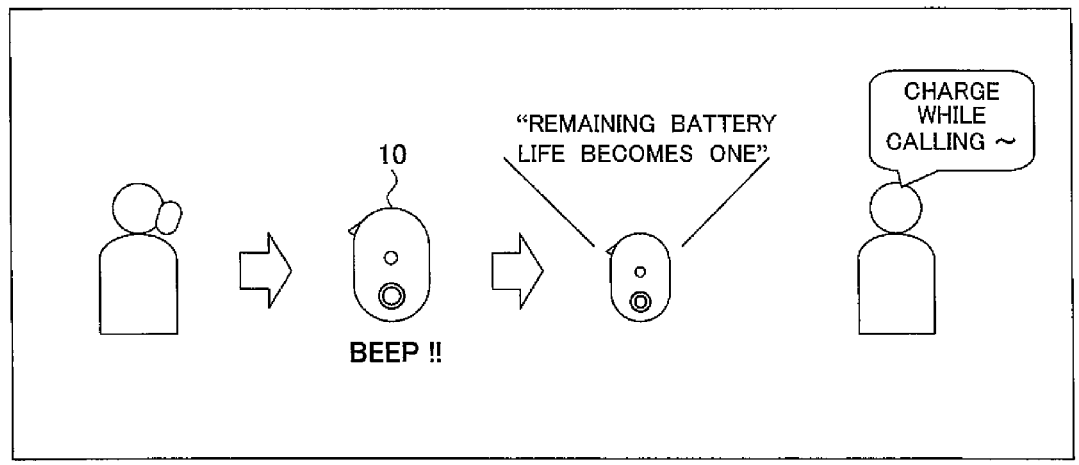
FIG. 17 is a diagram showing a use scene of the audio readout function while the user is in the middle of a call of the second embodiment.
Figure 18:
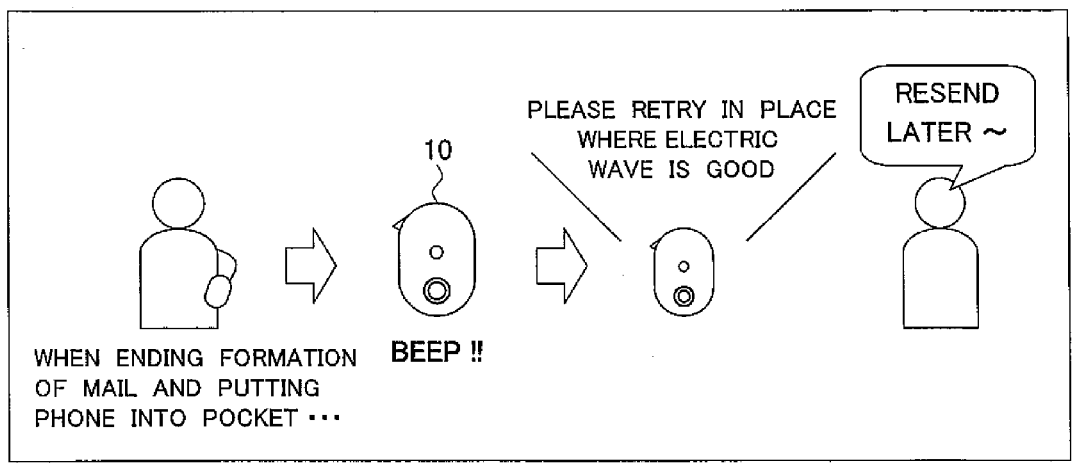
FIG. 18 is a diagram showing a use scene of the audio readout function while the user is drafting mail of the second embodiment.

Further, FIG. 16 is a diagram showing a use scene of the audio readout function while the user is walking. FIG. 17 is a diagram showing a use scene of the audio readout function while the user is in the middle of a call. FIG. 18 is a diagram showing the use scene of the audio readout function while the user is drafting mail.

For example, when the user is walking around in the state with the mobile phone 10A in his pocket, when the battery life is going to run out, as shown in FIG. 16, the audio readout such as "remaining battery life one" is carried out after the audio alarm "beep" is issued. An opportunity of considering for example buying an auxiliary charging battery at a convenience store can be given to the user who hears this.

Further, when the battery life is going to run out in the same way when the user is scheduled to receive a call and is waiting for the call as shown in FIG. 17, the audio readout such as "remaining battery life one" is carried out after the audio alarm "beep" is issued. The user who hears this take steps in advance for the expected call such as connecting the charger to a charging terminal by a connector with the intent of charging the phone while talking.

Further, when the user drafts an e-mail and instructs its transmission, usually the control unit instructs the transmission, establishes communication with the base station, calls up a predetermined mail server etc., and transmits the e-mail by a predetermined packet etc. Therefore, there is a time lag of about a few seconds from when the user instructs the transmission to the completion of transmission. At the time of such mail transmission, as shown in FIG. 18, the user frequently puts the mobile phone 10A back in his pocket expecting the success of the transmission when the transmission is not yet completed, for example, when preparing the e-mail in the state where the electric wave situation is good, then instructing the transmission and waiting for connection to the mail server. At this time, if the electric wave state becomes bad after putting the phone into his pocket, the audio alarm "beep" is generated, then the audio readout "please retry in a place where the electric wave is good" is performed. The user hearing this can then take a step such as retransmission of the e-mail later or change of the place and therefore a situation where he is not conscious of failure of transmission of the e-mail can be prevented as much as possible.

As explained above, according to the present embodiment, the device is provided with the memory 12 for storing text in accordance with the readout field, the audio alarm generation unit 50 for generating the audio alarm, the audio synthesizing processing unit 17 for converting the text stored in the memory 12 to the speech data at the time of readout, the audio output unit 171 for outputting the speech data or audio alarm, and the control unit 26A for performing control so as to output the audio alarm at the audio output unit and then output the speech data in accordance with the reason of the readout start when outputting the speech data at the audio output unit 171, therefore effects such as drawing the attention of the user (listener) side by issuing the audio alarm before the readout and eliminating gaps in hearing can be obtained.

It is possible to set whether to perform the readout automatically or perform the readout by the depression of a button. Further, even when setting automatic readout, it is possible for the user not to issue the audio alarm when there is no necessity of audio alarm. The user can set the audio alarm before readout without troublesome operation. In addition, the audio alarm can be generated only when it is necessary.

Further, according to the mobile phone 10A of the present embodiment, by operation with respect to the dial input unit 14, the words of the displayed text can be enlarged/reduced. Therefore, the viewability of the text is improved. At the same time, when enlarging/reducing words of the text, processing in accordance with the display format of the text is carried out, therefore the viewability and user friendliness of the operation are further improved.

Third Embodiment

Figure 19:
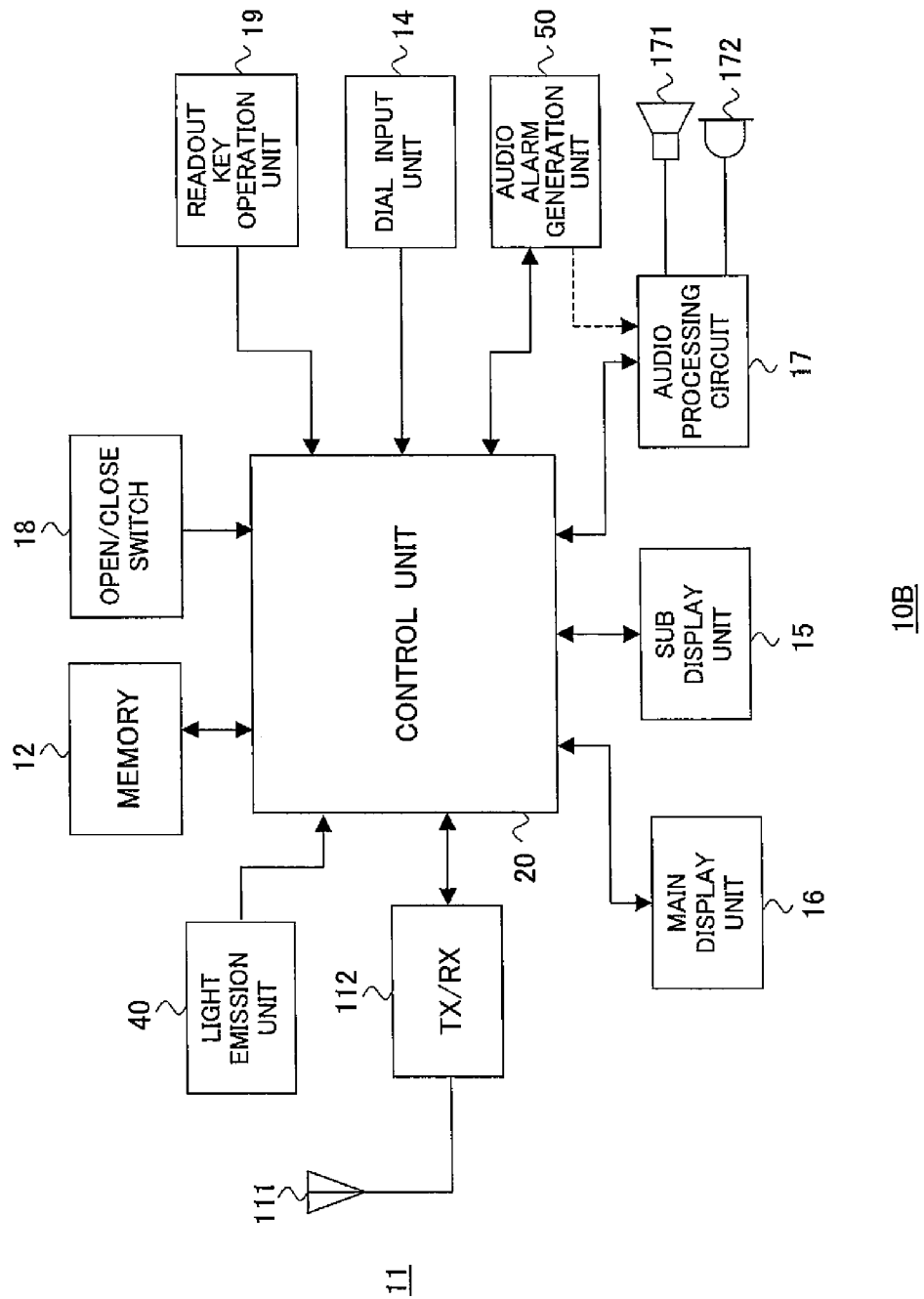
FIG. 19 is a block diagram illustrating an example of the system configuration of a mobile phone of a third embodiment.
Figure 20C:
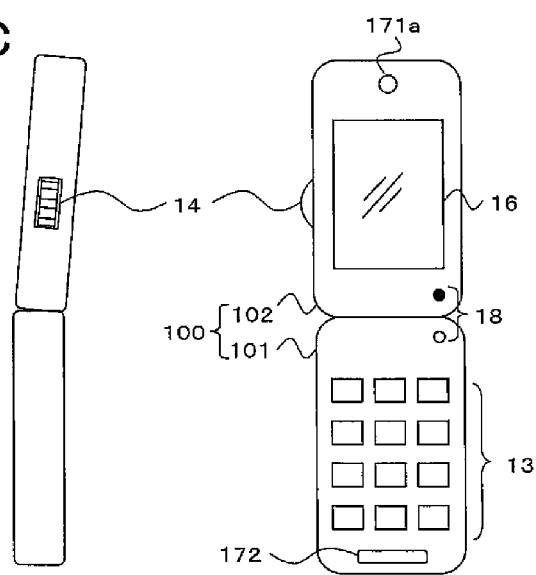
Figure 20A:
Figure 20D:
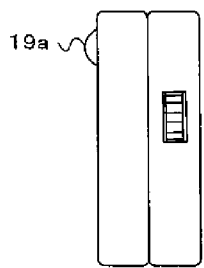

A third embodiment of the mobile terminal device of the present invention will be explained with reference to FIG. 19 and FIG. 20 to FIG. 20D.

A mobile terminal device 10B of the third embodiment of the present invention can notify to user of a variety of information and enables a check of the contents of the information by a simple operation.

The mobile terminal device 10B illustrated in FIG. 19 and FIG. 20A to FIG. 20D differs from the mobile terminal device 10 illustrated in FIG. 1 and FIG. 2A to FIG. 2S in that a light emission unit 40 is added and the external connection unit 25 is deleted. The rest of the components are substantially the same between the mobile terminal device 10 of the first embodiment and the mobile terminal device 10B of the third embodiment. However, the control unit 26 of the first embodiment and a control unit 26B of the third embodiment differ in processing contents explained below.

Below, the characteristic features (differences) of the mobile terminal device 10B of the third embodiment will basically be explained.

Both of the sub display unit 15 and the main display unit 16 are embodiments of the displaying means of the present invention, while the control unit 26B is an embodiment of the controlling means of the present invention. The light emission unit 40 is an embodiment of the light emitting means of the present invention.

The memory 12 stores management information including the information for managing the remaining level of battery life, electric wave state, and other internal operation states and the information for managing e-mail reception and other externally acquired data. This management information is updated by the control unit 26B according to need. For example, when there is an occurrence of an event such as an unanswered call (call which the user did not pick up) or an unread e-mail (e-mail whose text is not yet displayed), the contents of the management information are updated by the control unit 26B.

Information linking the change of the management information (updating of the management information) and a light emission color and its pattern is previously stored in the memory 12 in order to suitably notify the change of the management information to the user when the change occurs. Due to this, the mobile phone 10B according to the present embodiment is configured so that for example the light emission unit 40 emits light with a predetermined color and predetermined light emission pattern when newly receiving e-mail.

It is also possible to compose the text to be stored in the memory 12 so that the text is linked with a change of the management information. For example, it is also possible to compose the text so that the text is linked with the management information itself separately from this or in addition to this.

The "readout field (notification field)" to be informed (notified) by the readout function explained later includes the "management information after change" and "how the management information changed". The text may be stored in the memory 12 for either of them.

The pushbutton 19a is an embodiment of the input key of the present invention.

The mobile phone 10B according to the present embodiment has a readout function. When the pushbutton 19a is depressed (operated), the audio is output from the ringer speaker 171b in the closed state, while audio is output from the speech receiving speaker 171a in the opened state.

The control unit 26B explained later judges the open/closed state of the mobile phone 10B by the output of the open/close switch 18, then notifies the destination of the audio output for readout to the audio processing unit 17.

The control unit 26B controls the light emission unit 40 and turns on the LED when there is a change in the management information. Further, when the pushbutton 19a is operated by the user in the state where the LED is turned on, this executes the readout function of the content concerning the management information (corresponding to the reading out means of the present invention). At this time, as the readout function, not the method of outputting the speech data for readout, but the text readout method of extracting/generating the text string and reading out the text is used.

For example, as an example of the change of the management information, when the "remaining level of battery life" of the information for managing the operation state of the inside of the mobile phone 10B changes, the control unit 26B extracts the text string expressing the change of the remaining level of battery life ("remaining level of battery life small" etc.) from the memory 12 and read outs this.

Further, as an example of the change of the management information, when e-mail reception information of the information for managing the data acquired from the outside changes, the control unit 26B extracts the data for each of fields of the e-mail ("sender", "subject", "text" etc.) from the memory 12 to the work area in the control unit 26B, then generates the text string for readout and read outs the text string. For example, when it is previously designated to notify only the "sender", a text string such as "mail from Tamura-san" is generated and is read out.

In this way, the control unit 26B basically read outs the text corresponding to a change in the management information by the readout function when there is a change.

As in the example explained above, text such that the battery life being reduced must be linked with the "change" of the management information. For example, when "battery life is reduced" is linked with the second gradation of the battery life of the management information of the battery life, "battery life is reduced" is read out even when the gradation changes from the first gradation to the second gradation, so a contradiction occurs. Accordingly, it is necessary to link the text "battery life is reduced" with the "change of management information" from the third gradation to the second gradation.

Note that by just linking the text to the management information itself separately from the configuration of linking the text with a change of the management information, the user can be notified of a variety of information and the contents of the information can be checked with a simple operation.

For example, by linking "battery life is second gradation" to the second gradation of the battery life and only reading out the text of the changed management information after a change of the management information of the battery life from the third gradation to the second gradation occurs, the user can sufficiently understand the meaning. Other than this, the same can be said for "outside area of service" for "becoming outside the area of service".

The control unit 26B sequentially scans the extracted/generated text string from the first word and supplies the text data and synthesizes the audio in units of sentences while referring to the readout database in the memory 12 and considering the surrounding context in advance. According to this readout function, for example, change to a male voice, change to a female voice, and change of the readout speed are possible.

The audio synthesis result generated by the control unit 26B is processed by the audio processing unit 17 and output from the speech receiving speaker 171a or the ringer speaker 171b.

At this time, the control unit 26B controls the audio processing unit 17 so that the audio is output by the ringer speaker 171b in the case where the open/close switch 18 is in the ON state, that is, the case where the mobile phone 10B is in the closed state as shown in FIG. 3, and the audio is output from the speech receiving speaker 171a in the case where the open/close switch 18 is in the OFF state, that is, the case where the mobile phone 10B is in the opened state.

The light emission unit 40 is configured by a plurality of LEDs and an LED drive circuit and can emit light having a variety of colors. For example, by configuring the same by a red color LED, a blue color LED, and a green color LED, colors in a broad range can be emitted in accordance with the color scale.

The LED drive circuit drives the plurality of LEDs by a control signal from the control unit 26B. Due to this, the light emission unit 40 emits light having a variety of colors and patterns (blinking/turning on) in accordance with the control signal.

Note that the light emission unit 40 is an embodiment of the light emitting means of the present invention.

Next, the positional relationship between the pushbutton 19a of the readout key input unit 19 and the LEDs of the light emission unit 40 will be explained.

The mobile phone 10B according to the present embodiment links the transmission of information by light emission and the operation button by making the pushbutton 19a per se or the vicinity of the pushbutton 19a emit light. The LEDs are arranged in the vicinity of the pushbutton 19a from such a viewpoint.

Figure 20B:
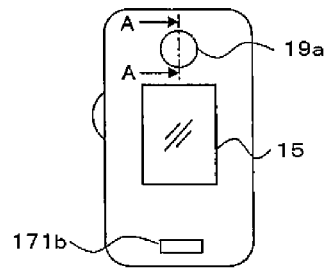
Figure 21A:
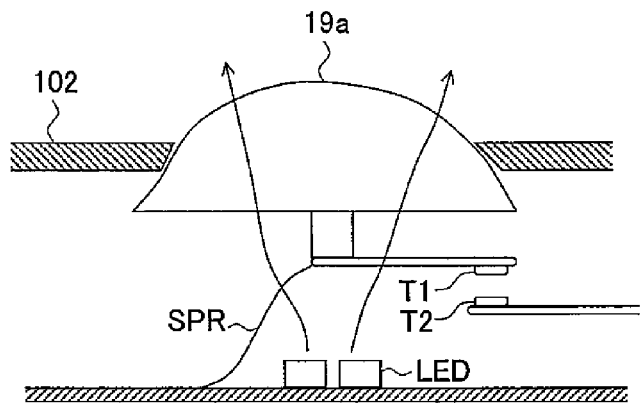
FIG. 21 show an example illustrating a readout key and a light emission unit according to the third embodiment.
Figure 21B:
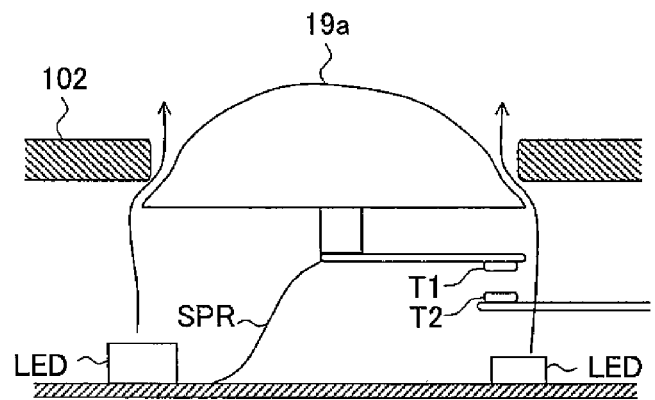
Figure 21C:
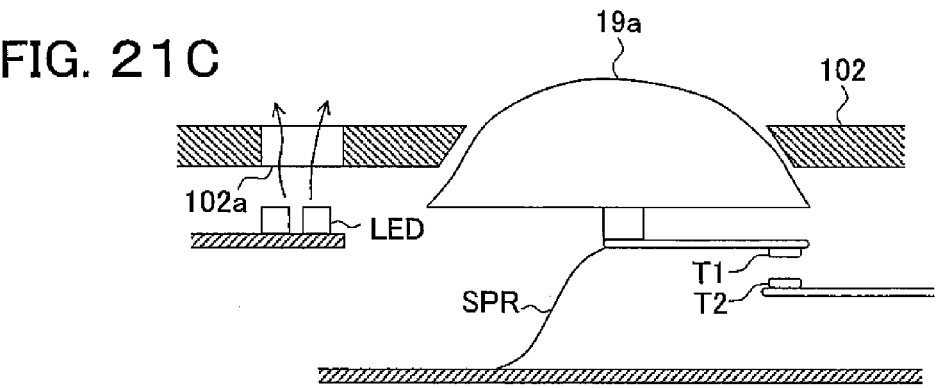

FIG. 21A to FIG. 21C are sectional views taken along a cross-section A-A shown in FIG. 20B and show a variety of embodiments for the positional relationship between the pushbutton 19a and the LEDs.

Note that in FIG. 21A to FIG. 21C, the light paths of the light emitted from the LEDs are represented by arrows. Further, for the configuration of the contact of the pushbutton, a variety of embodiments can be considered. A specific example of configuration is not intended here. Further, two LEDs are shown, but this is only an example. Needless to say, the number of LEDs can be freely set.

In the embodiments of FIG. 21A to FIG. 21C, the pushbutton 19a is connected to a plate spring (SPR). When the pushbutton 19a is depressed (operated), an electric signal is input to the control unit 26B by electric conduction by the contact of the contacts T1 and T2.

In FIG. 21A, the pushbutton 19a is formed by a light transmitting type resin or the like. The LEDs are arranged immediately beneath the pushbutton 19a. Due to this, when the LEDs emit light, the user recognizes this as if the pushbutton 19a per se emitted the light. Accordingly, the issuance of information corresponding to the pushbutton 19a is recognized by the user.

In FIG. 21B, a small clearance is provided between the display side body case 102 and the pushbutton 19a. The LEDs are arranged immediately beneath that. Due to this, in the same way, when the LEDs emit light, the user recognizes this as if the pushbutton 19a per se emitted the light. Accordingly, the issuance of information corresponding to the pushbutton 19a is recognized by the user.

In FIG. 21C, transparent glass 102a is provided at part of the display side body case 102 in the vicinity of the pushbutton 19a. The LEDs are arranged immediately beneath the transparent glass 102a. Due to this, when the LEDs emit light, the issuance of information corresponding to the pushbutton 19a is recognized by the user.

Further, when there are a plurality of buttons 19a and information linked with those are different, the user can determine which type of information is being issued by just viewing which button is emitting the light. This assists the user in judging whether or not quick action is necessary.

Next, an example of settings of the light emission color and light emission pattern when the management information changes due to the occurrence of an event such as reception of e-mail will be explained.

FIG. 22A and FIG. 22B show an example of settings of the light emission color and light emission pattern linked with the occurrence of events, in which FIG. 22A shows the relationship between the type of event and the light emission color, and FIG. 22B shows the relationship between the readout range by the readout function and the light emission pattern.

For example, as shown in FIG. 22A, when the event of reception of new e-mail occurs, the control unit 26B updates the management information in the memory 12 and, at the same time, makes the LEDs of the light emission unit 40 emit light of a "green" color. Due to this, the user is notified of the reception of e-mail.

Further, as shown in FIG. 22B, when only notifying the number of e-mails unread by the user, the light turns on only once in the light emission pattern. Further, when notifying the number of e-mails which unread by the user and names of senders, the light turns on twice in the light emission pattern.

Note that the device is configured so that the readout range in the information included in the e-mail can be set by the user previously operating the menu screen.

As explained above, by linking events and the light emission color and light emission pattern corresponding to that, the user can be notified of the type of event by visual information.

When the user recognizes such light emission and depresses the pushbutton 19a, the information in accordance with the light emission color and light emission pattern is read out by the readout function.

For example, in the example shown in FIG. 22A and FIG. 22B, when the "green" color is turned on only one time, the information of only the number of unread e-mails is read out as "there are two unread mails". Namely, the control unit 26B accesses the management information in the memory 12, extracts the data of the number of unread e-mails, generates the text string "there are two unread mails", and read outs this.

Note that an example of the light emission color and the light emission pattern set linked with the occurrence of events was shown with reference to FIG. 22A and FIG. 22B, but the invention is not limited to the occurrence of events. Any information is possible so far as it is information managed as the management information.

For example, FIG. 23A and FIG. 23B show an example of changing the light emission color in accordance with the sender of the e-mail. In this way, when the light emission color is changed according to the sender, it becomes easy for the user to judge whether or not this information is information having content which must be checked soon by depressing the pushbutton 19a.

Next, the light emission processing performed by the control unit 26B will be explained with reference to FIG. 24.

Figure 24:
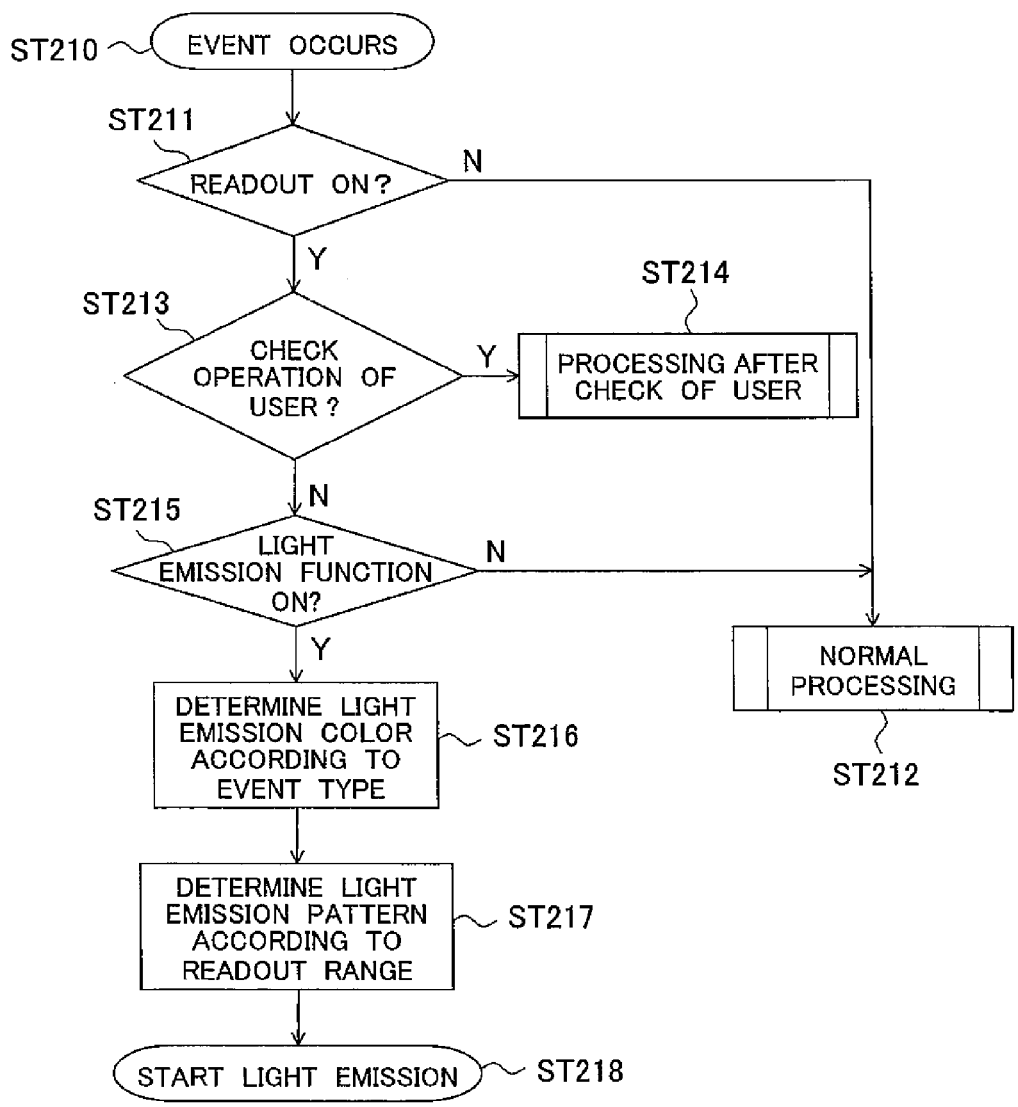
FIG. 24 is a flow chart showing light emission processing of the third embodiment.

FIG. 24 is a flow chart showing an example of the light emission processing.

The mobile phone 10B is configured so that operation/no operation (ON/OFF) of the readout function and operation/no operation (ON/OFF) of the LED light emission function can be selected by the user. When a change of the management information occurs, the control unit 26B performs the processing by judging this information.

First, when an event such as reception of e-mail occurs (step ST210), the control unit 26B judges operation/no operation (ON/OFF) of the readout function. When the result is no operation of the readout function, the control unit 26B performs the usual processing (step ST212).

The "usual processing" is the processing for notification of information to the user when not using the LEDs and the readout function. For example, when the occurrence of the event is the reception of e-mail, this is processing for displaying an icon etc. indicating the reception of the e-mail at the display units.

Then, the control unit 26B judges whether or not a check operation of the user has occurred (step ST213). Here, the "check operation of the user" means for example the operation of the user opening the case from the closed state immediately after the reception of the e-mail. The control unit 26B judges the check operation of the user by detecting the change of the state of the open/close switch 18 (from ON state to OFF state).

Where the user opens the case after an event such as reception of e-mail, the user has already been notified of the reception of e-mail, so has already recognized the occurrence of the event. Therefore, it is not necessary to again notify the occurrence of the event by using the LEDs, so the required post-processing is carried out without making the LEDs emit light (step ST214). In the post-processing, in the case of for example the reception of e-mail, the readout etc. of the text of the e-mail is carried out.

Next, the control unit 26B judges operation/no operation (ON/OFF) of the LED light emission function (step ST215). As a result, when the LED light emission function is set in the no operation state, and the control unit 26B performs the above usual processing without light emission of the LEDs.

When the LED light emission function is set to the operation state, the control unit 26B retrieves the light emission color and light emission pattern corresponding to the occurrence of the event from the memory 12 and selects and determines the same in order to make the LEDs emit light (steps ST215 and ST217), then drives the LEDs to emit the light with the selected light emission color and light emission pattern.

As explained above, according to the mobile phone 10B of the present embodiment, the LEDs are made to emit light with a variety of colors and patterns corresponding to the change of the management information. At the same time, when the pushbutton 19a is depressed during the light emission of the LEDs, the readout of the information in accordance with the change of the management information thereof is carried out.

Accordingly, the user can recognize the change of the management information by the visual information. For example, the reception of new e-mail and unanswered calls can be recognized by the light emission color and its pattern.

At that time, by previously setting the level of the information to be read out, when the change of management information is notified, the user can recognize the level of the read out information, the operation friendliness is improved, and the user can recognize the information to be output by audio before the pushbutton 19a is depressed.

For example, when outputting by audio only number of received e-mails, when outputting by audio the number of mails and the names of the senders, etc., by changing the light emission pattern according to the information level, the user can depress the pushbutton 19a to determine again which degree of information is issued. That is, the fact that the current settings set readout up to the text etc. can be determined at a single glance, therefore the user can prevent a situation arising where private mail text is suddenly read out during work as much as possible.

The mobile phone 10B of the present embodiment detects that the case is in the closed state and sets the destination of the audio output as the ringer speaker 171b, therefore it becomes possible for the user to check the readout audio up to the text of the e-mail in the closed state of the case as it is.

According to the mobile phone 10B of the present embodiment, the LEDs are arranged in the vicinity of the pushbutton 19a, therefore the pushbutton 19a which should be depressed by the user is highlighted by the light emission of the LEDs, so erroneous operation of the user can be prevented and operation can be reliably carried out even in a dark place.

The mobile phone 10B according to the present embodiment is configured so that the readout of the information to be notified is started when the user opens the case without depressing the pushbutton 19a, therefore gaps in notification of information by audio can be eliminated.

Further, in the mobile phone 10B according to the present embodiment, by just linking the text to the management information itself separately from linking the text to the change of the management information, the user can be notified of a variety of information and the content of the information can be checked by a simple operation.

Other Embodiments

The present invention is not limited to the first to third embodiments explained above.

Further, the present invention can appropriately combine the first to third embodiments such as for example described in the claims and/or the "means for solving the PROBLEM".

As a preferred embodiment of the mobile terminal device of the present invention, a mobile phone was exemplified, but the present invention can be applied to other various terminal devices having functions and/or configurations equivalent or similar to the mobile phone explained above.

The invention claimed is:

1. A mobile terminal device having an audio readout function, said mobile terminal device comprising:
   a storage unit for storing texts in accordance with readout items;
   an audio alarm generation unit for generating an audio alarm;
   a text-to-speech unit for converting a text to speech data;
   an audio output unit for outputting said speech data or said audio alarm;
   an operation unit able to point out a skip operation by recognizing break positions specific for e-mail including at least any one of a reception date, sender, and subject among contents and a skip-back operation to thereby select readout items, and to instruct a readout; and
   a control unit for executing a readout processing in accordance with the operation by the operation unit at the time of readout, said readout processing including:
   a first control processing of outputting said audio alarm at said audio output unit, executing an extraction of a text from the storage unit in accordance with a text rule, and making a conversion of the extracted text to a speech data at the text-to-speech unit, and outputting the converted speech data when outputting said speech data at said audio output unit; and a second control processing of executing an extraction of a text from the storage unit in accordance with a text rule, and making a conversion of the extracted text to a speech data at the text-to-speech unit, and outputting the converted speech data without outputting said audio alarm at said audio output unit, wherein
   the control unit starts the readout in the second control processing when the readout is instructed, an operation of a key generates a signal, and the control unit determines one of the skip operation and the skip-back operation based on a number of times the signal is generated within a predetermined period of time.

2. The mobile terminal device as set forth in claim 1, wherein when a change of state, concerning operations of the mobile terminal device, occurs, said control unit starts the readout in accordance with said change of state by said first control routine.

3. The mobile terminal device as set forth in claim 2, wherein
   the device comprises a battery, and
   said change of state is a change of a remaining level of said battery life.

4. The mobile terminal device as set forth in claim 2, wherein
   the device comprises a communication unit, and
   said change of state is a change an electric wave state in said communication unit.

5. The mobile terminal device as set forth in claim 2, wherein as said change of state, weighting is assigned for each state, and
   said control unit starts the readout in accordance with said weighting.

6. The mobile terminal device as set forth in claim 1, wherein the device comprises:
   a communication unit which can be connected to a communication network; and
   an audio notification generation unit for generating an audio notification, wherein
   when processing occurs for reception of a message or call from said communication network by said communication unit, said control unit makes said audio output unit output said audio notification and performs the readout in said second control routine.

7. The mobile terminal device as set forth in claim 1, wherein said control unit makes said audio output unit output said speech data after an elapse of a predetermined time from the output of said audio alarm at the time of readout in said first control routine.

8. The mobile terminal device as set forth in claim 7, wherein
   the device comprises an operation unit, and
   said control unit stops said audio output unit to output said speech data when there is an input from said operation unit during said predetermined time.

9. The mobile terminal device as set forth in claim 8, wherein
   said operation unit is linked with predetermined processing, and
   said control unit only stops said audio output unit outputting said speech data and does not perform said predetermined processing when input occurs from said operation unit during said predetermined time.

10. The mobile terminal device as set forth in claim 9, wherein
    the predetermined instruction instructed by said operation unit is a play-forward or play-backward operation, and
    said control unit performs control so as to read out the text from the nearest break position in an output direction of the text at the time of the instruction input during readout when said predetermined instruction is an instruction for play-forward and performs control so as to read out the text from the nearest break position in an outputted direction at the time of the instruction input when the predetermined instruction is an instruction for playing-backward.

11. The mobile terminal device as set forth in claim 1, wherein
    the device comprises an operation unit,
    said text has break positions for the audio readout, and said control unit can recognize the predetermined break in the text data to be read out when said audio output unit outputs said speech data, and if a predetermined instruction is made by said operation unit, said control unit performs control so as to read out the text from either of the break positions before or after the readout position of the text when an instruction input is occurred.

12. The mobile terminal device as set forth in claim 11, wherein said break position is a position given a punctuation mark.

13. The mobile terminal device as set forth in claim 11, wherein the device has a communication unit connected to a communication network and transmitting or receiving a message, and said control unit performs control so as to consider a position between a component indicating a sender or a destination of the message and a component indicating the body of message as said break position at the time of the readout of said message.

14. The mobile terminal device as set forth in claim 13, wherein said control unit performs control to read out a component name together with each component at the time of readout of said message.

15. The mobile terminal device as set forth in claim 14, wherein said storage stores text of honorifics and address information including names, and said control unit performs control so as to read out said honorific together with the name retrieved from said address information based on the component indicating the sender or destination of the message at the time of readout of said message.

16. The mobile terminal device as set forth in claim 11, wherein said predetermined instruction is a play-forward or play-backward operation, and when a play-forward instruction occurs from said operation unit while reading out text at a first speed that is normal speed at said audio output unit, said control unit performs control so as to read out the text at a second speed faster than the first speed from a position reading at a time of said play-forward instruction occurs to a break position nearest forward to the position of said play-forward instruction occurs at a second speed faster than the first speed, and then performs control so as to return the speed to the first speed since said break position for readout.

17. The mobile terminal device as set forth in claim 11, wherein said predetermined instruction includes a play-backward operation, and when a play-backward instruction occurs from said operation unit, said control unit performs control so as to return the position of break backward to the readout position at the point of time of the play-backward instruction for readout, and if another play-backward instruction occurs after said play-backward instruction, said control unit performs control so as to return to a further prior break position for readout.

18. The mobile terminal device as set forth in claim 1, further comprising:

an external connection device having an external operation unit connecting externally to instruct a readout operation to said control unit and a second audio output unit, wherein said control unit performs control so as to output said speech data at said second audio output unit when said external connection device is connected.

19. The mobile terminal device as set forth in claim 18, further comprising:

a communication unit which can be connected to a communication network; and an audio notification generation unit for generating an audio notification, and wherein said control unit performs control so as to generate said audio notification and make said second audio output unit output the audio notification when said communication unit receives a call reception request from said communication network, suspend the output the audio notification and make said communication unit start response processing to said call reception request when said external operation unit is operated.

20. The mobile terminal device as set forth in claim 18, wherein said external operation unit includes at least one external key, and said control unit has a plurality of processing as a predetermined instruction, counts a number of times of input of a signal generated by operation of said external key in a predetermined time, and processes any of said plurality of processing in accordance with the count.

21. The mobile terminal device as set forth in claim 1, wherein said external operation unit is configured by at least one external key, and said control unit has a plurality of processing as a predetermined instruction, counts a time which the signal generated by operation of said external key continues, and processes any of said plurality of processing in accordance with the continuing time.

22. The mobile terminal device as set forth in claim 1, comprising a light emission unit and an operation unit able to instruct readout, wherein said control unit performs control so as to instruct light emission to said light emission unit when a change of state occurs, and to read out information concerning the change of state when said operation unit is operated after the light emission unit is made to emit light.

23. The mobile terminal device as set forth in claim 22, wherein said operation unit includes a plurality of input keys, a plurality of said light emission units are provided and linked with the plurality of input keys of said operation unit, and said control unit performs control so as to instruct light emission to one of said light emission units in accordance with the type of the change of state when a change of state occurs, and to instruct readout of information concerning the change of state when said input key corresponding to the light emission unit instructed to perform the light emission is operated.

24. The mobile terminal device as set forth in claim 23, comprising:

a plurality of connected cases able to form an opened state/closed state, wherein said input keys and said light emission units are arranged at exposed positions in the closed state of said cases.

25. The mobile terminal device as set forth in claim 24, wherein when said case is formed to an opened state while light emitted by said light emission unit with the case closed, said control unit performs control so as to read out information concerning the change of state causing the light emission.

26. The mobile terminal device as set forth in claim 22, wherein said light emission unit has a plurality of light emission types, and said control unit instructs light emission with one light emission type previously assigned to the type of change of state among said plurality of light emission types.

27. The mobile terminal device as set forth in claim 26, wherein said text comprises a plurality of items, and said control unit can perform control so as to read out said text for each item, and makes the light emission unit emit light with one light emission type previously assigned to each of said plurality of items from among said plurality of light emission types.

28. The mobile terminal device as set forth in claim 26, wherein said text comprises a plurality of items, and said control unit can perform control so as to read out said text for each item, and makes the light emission unit emit light with one light emission type previously assigned to each of a combination of items of said text.

29. A readout control method in a mobile terminal device having an audio readout function, said readout control method comprising:

a step of storing texts in accordance with readout items;

a step of generating an audio alarm;

a text-to-speech step of converting a text to a speech data;

an audio output step of outputting said speech data or said audio alarm;

a step of pointing out a skip operation by recognizing break positions specific for e-mail including at least any one of a reception date, sender, and subject among contents and a skip-back operation to thereby select readout items, and to instruct a readout, a first control step of outputting said audio alarm at said output step, executing an extraction of a text stored in said storing step in accordance with a text rule, and making a conversion of the extracted text to a speech data in said text-to-speech step, and outputting the converted speech data when outputting said speech data in said audio output step; and a second control step of executing an extraction of a text stored in said storing step in accordance with a text rule, and making a conversion of the extracted text to a speech data in said text-to-speech step, and outputting the converted speech data without outputting said audio alarm at said audio output step, wherein the readout is started in the second control step when the readout is instructed an operation of a key generates a signal, and the control unit determines one of the skip operation and the skip-back operation based on a number of times the signal is generated within a predetermined period of time.

30. A non-transitory recording media storing a computer program for making a computer provided in a mobile terminal device execute processings, said computer comprising:

a storage unit for storing texts in accordance with readout items;

an audio alarm generation unit for generating an audio alarm;

a text-to-speech unit for converting the text stored in said storage unit to speech data;

an audio output unit for outputting said speech data or said audio alarm; and an operation unit able to point out a skip operation by recognizing break positions specific for e-mail including at least any one of a reception date, sender, and subject among contents and a skip-back operation to thereby select readout items, and to instruct a readout;

said computer program executing the following processings:

text-to-speech processing of outputting said speech data at a time of readout;

a first control processing of outputting said audio alarm at said audio output unit, executing an extraction of a text from the storage unit in accordance with a text rule, and making a conversion of the extracted text to a speech data at the text-to-speech unit, and outputting the converted speech data when outputting said speech data at said audio output unit; and a second control processing of executing an extraction of a text from the storage unit in accordance with a text rule, and making a conversion of the extracted text to a speech data at the text-to-speech unit, and outputting the converted speech data without outputting said audio alarm at said audio output unit, wherein the readout is started in the second control processing when the readout is instructed an operation of a key generates a signal, and the control unit determines one of the skip operation and the skip-back operation based on a number of times the signal is generated within a predetermined period of time.

* * * * *